US010628730B2

(12) United States Patent
Whritenor et al.

(10) Patent No.: US 10,628,730 B2
(45) Date of Patent: Apr. 21, 2020

(54) SYSTEM AND METHOD FOR PREDICTIVE CURATION, PRODUCTION INFRASTRUCTURE, AND PERSONAL CONTENT ASSISTANT

(71) Applicant: Kodak Alaris Inc., Rochester, NY (US)

(72) Inventors: James Whritenor, Mendon, NY (US); Mark Wood, Penfield, NY (US); Madirakshi Das, Penfield, NY (US); Joseph A. Manico, Rochester, NY (US); Peter Stubler, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 97 days.

(21) Appl. No.: 15/611,494

(22) Filed: Jun. 1, 2017

(65) Prior Publication Data

US 2017/0372192 A1    Dec. 28, 2017

Related U.S. Application Data

(60) Provisional application No. 62/344,764, filed on Jun. 2, 2016, provisional application No. 62/344,761, filed
(Continued)

(51) Int. Cl.
*G06F 16/30* (2019.01)
*G06N 3/00* (2006.01)
(Continued)

(52) U.S. Cl.
CPC ........... *G06N 3/006* (2013.01); *G06F 3/0482* (2013.01); *G06F 3/04817* (2013.01);
(Continued)

(58) Field of Classification Search
CPC ........ G06N 3/006; G06N 3/022; G06N 5/006; G06N 5/022; G06F 16/50; G06F 16/435;
(Continued)

(56) References Cited

U.S. PATENT DOCUMENTS

| 7,836,093 B2 | 11/2010 | Gobeyn et al. |
| 8,028,246 B2 | 9/2011 | McIntyre et al. |

(Continued)

OTHER PUBLICATIONS

International Search Report and Written Opinion issued in PCT/US2017/035490 dated Aug. 30, 2017.
(Continued)

*Primary Examiner* — Tarek Chbouki
(74) *Attorney, Agent, or Firm* — Hogan Lovells US LLP

(57) ABSTRACT

Data points, calendar entries, trends, behavioral patterns may be used to predict and pre-emptively build digital and printable products with selected collections of images without the user's active participation. The collections are selected from files on the user's device, cloud-based photo library, or other libraries shared among other individuals and grouped into thematic products. Based on analysis of the user's collections and on-line behaviors, the system may estimate types and volumes of potential media-centric products, and the resources needed for producing and distributing such media-centric products for a projected period of time. A user interface may take the form of a "virtual curator", which is a graphical or animated persona for augmenting and managing interactions between the user and the system managing the user's stored media assets. The virtual curator can assume one of many personas, as appropriate, with each user. For example, the virtual curator can be presented as an avatar-animated character in an icon, or icon that floats around the screen. The virtual curator can also interact with the user via text messaging, or audio messaging.

21 Claims, 13 Drawing Sheets

Related U.S. Application Data on Jun. 2, 2016, provisional application No. 62/344,770, filed on Jun. 2, 2016.

(51) Int. Cl.

| | |
|---|---|
| *G06F 9/451* | (2018.01) |
| *G06F 16/435* | (2019.01) |
| *G06F 16/50* | (2019.01) |
| *G06F 3/0481* | (2013.01) |
| *G06F 3/0482* | (2013.01) |
| *G06F 3/0484* | (2013.01) |
| *G06N 5/02* | (2006.01) |
| *G06Q 10/10* | (2012.01) |
| *G06Q 30/06* | (2012.01) |
| *G06Q 50/00* | (2012.01) |
| *G06T 13/40* | (2011.01) |

(52) U.S. Cl.
CPC .......... *G06F 3/04847* (2013.01); *G06F 9/453* (2018.02); *G06F 16/435* (2019.01); *G06F 16/50* (2019.01); *G06N 5/022* (2013.01); *G06Q 10/1093* (2013.01); *G06Q 30/0621* (2013.01); *G06Q 50/01* (2013.01); *G06T 13/40* (2013.01)

(58) Field of Classification Search
CPC .. G06F 3/0482; G06F 3/04817; G06F 3/0484; G06Q 10/1093; G06Q 30/0621; G06Q 50/01

See application file for complete search history.

(56) References Cited

U.S. PATENT DOCUMENTS

| | | | |
|---|---|---|---|
| 8,832,023 B2 | 9/2014 | Blomstedt et al. | |
| 8,910,071 B2 | 12/2014 | McIntyre et al. | |
| 8,934,717 B2 | 1/2015 | Newell et al. | |
| 10,157,351 B1* | 12/2018 | Rastogi | G06N 7/005 |
| 2002/0097259 A1 | 7/2002 | Marshall et al. | |
| 2004/0012809 A1 | 1/2004 | Appling | |
| 2007/0061190 A1* | 3/2007 | Wardell | G06Q 30/02 |
| | | | 705/7.34 |
| 2007/0255785 A1* | 11/2007 | Hayashi | H04L 67/104 |
| | | | 709/204 |
| 2008/0215984 A1* | 9/2008 | Manico | G11B 27/031 |
| | | | 715/730 |
| 2008/0304808 A1 | 12/2008 | Newell et al. | |
| 2009/0132264 A1 | 5/2009 | Wood et al. | |
| 2009/0158183 A1 | 6/2009 | McCurdy et al. | |
| 2010/0333137 A1 | 12/2010 | Hamano et al. | |
| 2011/0072035 A1 | 3/2011 | Gaucas et al. | |
| 2011/0087674 A1* | 4/2011 | Schokking | G06F 16/58 |
| | | | 707/748 |
| 2011/0258556 A1 | 10/2011 | Kiciman et al. | |
| 2012/0016817 A1 | 1/2012 | Smith et al. | |
| 2012/0093481 A1* | 4/2012 | McDowell | G11B 27/105 |
| | | | 386/241 |
| 2014/0143247 A1 | 5/2014 | Rathnavelu et al. | |
| 2014/0169644 A1 | 6/2014 | Dockhorn et al. | |
| 2014/0298364 A1 | 10/2014 | Stepanov et al. | |
| 2015/0112826 A1* | 4/2015 | Crutchfield, Jr. | G06Q 30/0601 |
| | | | 705/26.1 |
| 2015/0134673 A1 | 5/2015 | Golan et al. | |
| 2015/0142486 A1* | 5/2015 | Broady | G06Q 10/0631 |
| | | | 705/7.12 |
| 2015/0172463 A1 | 6/2015 | Quast et al. | |
| 2015/0186156 A1 | 7/2015 | Brown et al. | |
| 2016/0041957 A1 | 2/2016 | Finsterwald et al. | |
| 2016/0253710 A1* | 9/2016 | Publicover | H04W 4/21 |
| | | | 705/14.66 |
| 2017/0032384 A1 | 2/2017 | Harris et al. | |
| 2017/0039389 A1* | 2/2017 | Smith | G06F 21/6263 |
| 2017/0093780 A1 | 3/2017 | Lieb et al. | |
| 2017/0142035 A1* | 5/2017 | Bradley | H04L 51/32 |
| 2017/0236182 A1* | 8/2017 | Ignatyev | G06Q 30/0631 |
| | | | 705/26.7 |
| 2017/0301256 A1 | 10/2017 | Sedayao et al. | |

OTHER PUBLICATIONS

International Search Report and Written Opinion issued in PCT/US2017/035491 dated Aug. 30, 2017.
International Search Report and Written Opinion issued in PCT/US2017/035480 dated Sep. 1, 2017.
Office Action dated May 15, 2019 in U.S. Appl. No. 15/611,378.
Office Action dated Jan. 31, 2019 in U.S. Appl. No. 15/611,542.
European Office Action dated Feb. 10, 2020 in EP Patent Application No. 17 729 332.1-1222.

\* cited by examiner

| PROFILE DETAILS LUT | | | | |
|---|---|---|---|---|
| RELATIONSHIP | EMOTIONAL INTENT | OCCASION | CULTURAL PROFILE | RELIGIOUS AFFILIATION |
| ACQUAINTANCE | FUN | BIRTHDAY | US CENTRAL | CHRISTIAN |
| NEIGHBOR | HUMOR | WEDDING | US EAST | EVANGELICAL |
| COWORKER | FRIENDSHIP | HOLIDAY | US WEST | CATHOLIC |
| CLIENT | ROMANCE | PERSONAL | JAPAN | JEWISH |
| EMPLOYEE | GOOD WILL | ILLNESS | CHINA | ISLAM |
| SUPERVISOR | RESPECT | NEW JOB | KOREA | HINDU |
| FRIEND | CONDOLENCE | NEW BABY | FRANCE | BUDDHIST |
| CLOSE FRIEND | AFFECTION | FUNERAL | UK | BAHA'I |
| ROMANTIC | LOVE | BON VOYAGE | MIDDLE-EAST | SHINTOISM |
| RELATIVE | CONGRATULATIONS | CHRISTMAS | AFRICA | TAOIST |
| CHILD | THINKING OF YOU | HANUKAH | TURKEY | AGNOSTIC |
| PARENT | FORGIVENESS | RAMADAN | MEXICO | ATHEIST |
| SIBLING | SYMPATHY | ANNIVERSARY | ARGENTINA | HUMANIST |
| IN-LAW | APPRECIATION | ENGAGEMENT | BRAZIL | SANTERIA |

FIG.10a

| CARD COMPONENTS LUT | | | | |
|---|---|---|---|---|
| FONT COLORS | GRAPHICS | FLOWERS | SYMBOLS | LANGUAGE |
| RED | WATERCOLOR | WHITE-ROSES | CAT | US ENGLISH |
| LIGHT-RED | OIL PAINTING | RED-ROSES | BUTTERFLY | UK ENGLISH |
| DARK-RED | PHOTO | PINK-ROSES | MOUSE | SPANISH |
| PINK | SOLEMN | POPPY | BADGER | PORTUGUESE |
| ORANGE | CLASSICAL | CARNATION | SNAKE | FRENCH |
| GREEN | TRENDY | VIOLETS | TURTLE | DUTCH |
| LIGHT-GREEN | TRADITIONAL | PANSIES | DOG | JAPANESE |
| DARK-GREEN | HUMOROUS | CHERRY | W ASTROLOGY | CANTONESE |
| TURQUOISE | SWEET | ORANGE | E ASTROLOGY | MANDARIN |
| BLUE | CASUAL | APPLE | CROSS | KOREAN |
| LIGHT-BLUE | FORMAL | ZINNIA | STAR OF DAVID | AFRIKAANS |
| DARK-BLUE | INSPIRATIONAL | DAISY | MOON & STAR | SOMALI |
| COBALT | FRIENDLY | SNAP DRAGON | NAMASTE | ARABIC |
| WHITE | RESPECTFUL | TIGER LILY | YING YANG | FARCIE |

FIG.10b

SYSTEM AND METHOD FOR PREDICTIVE CURATION, PRODUCTION INFRASTRUCTURE, AND PERSONAL CONTENT ASSISTANT

CROSS REFERENCE TO RELATED APPLICATIONS

The present application claims priority to: (i) U.S. provisional patent application No. 62/344,764, entitled "System and Method for Predictive Curation, Production Infrastructure, and Personal Content Assistant," filed Jun. 2, 2016, (ii) U.S. provisional patent application No. 62/344,761, entitled "System and Method for Predictive Curation, Production Infrastructure, and Personal Content Assistant," filed Jun. 2, 2016, and (iii) U.S. provisional patent application No. 62/344,770, entitled "System and Method for Predictive Curation, Production Infrastructure, and Personal Content Assistant," filed Jun. 2, 2016. The disclosures of the above-referenced applications are hereby incorporated by reference.

BACKGROUND OF THE INVENTION

The present invention relates to providing services to a user based on analysis of the user's preferences and behaviors. In particular, the present invention relates to providing and recommending services to a user based on analysis of information collected from the user's media assets (e.g., photograph, music and video collections), on-line, and social media activities.

With the proliferation of portable networked devices (e.g., smart phones, tablets, laptops, and connected digital cameras), the costs associated with recording and storing multimedia assets are insignificant. Consequently, users are accumulating vast collections of still images and video clips. The amount of a user's personal multimedia assets makes it difficult to identify and locate the more important ones. Also, because of a desire to document, recognize, and memorialize every day and important life events, many users record images and videos as everyday events unfold. Typically, such multimedia content are first captured in the internal memory of a device, which is then transferred to a hard drive of a personal computer, a networked storage device, a portable hard drive, a solid state memory, or remote cloud-based storage. Very often, the best multimedia content recorded at an individual's important event is recorded by another attending the event, but who has neglected to share this content with the other attendees, despite being a close personal friend or a family member to the individual. Therefore, a convenient and systematic way for locating, sharing, and using assets from multiple multimedia content collections can be very valuable.

Many users store personal content, such as images, in cloud-based storage services (e.g., Dropbox, Google Photos, Amazon Cloud Drive), the actual capture device (e.g., a smartphone), a portable hard drive, a personal computer, or on a social network (e.g., Facebook), or a combinations of these approaches. However, as mentioned above, all too often when a user wishes to retrieve a specific image, to share an image with a friend or family member, or to use an image in a personal media-centric gift (e.g., a photo greeting card, photo calendar, photo album, or a digital movie or slideshow), he or she is unable to locate the image in a timely and efficient manner.

Analysis of a user's media assets, such as photographs, or music and video collections, enables various commercial or social applications. Such applications are disclosed, for example, in (a) U.S. Pat. No. 7,836,093, entitled "IMAGE RECORD TREND IDENTIFICATION FOR USER PROFILES" to Gobeyn et al.; (b) U.S. Pat. No. 8,910,071, entitled "IMAGE DISPLAY TABS FOR ACCESSING SOCIAL INFORMATION" to McIntyre et al., (c) U.S. Pat. No. 8,028,246 entitled "CONCIERGE—SHOPPING ASSISTANT" also to McIntyre et al., (d) U.S. Patent Application Publication 2009/0132264, entitled "MEDIA ASSET EVALUATION BASED ON SOCIAL RELATIONSHIPS" by Wood et al.; (e) U.S. Pat. No. 8,832,023, entitled "SYSTEM FOR MANAGING DISTRIBUTED ASSETS AND METADATA" to Blomstedt et al.; and (f) U.S. Pat. No. 8,934,717, entitled "AUTOMATIC STORY CREATION USING SEMANTIC CLASSIFIERS FOR DIGITAL ASSETS AND ASSOCIATED METADATA" to Newell et al.

In data mining, transaction histories (e.g., purchases, online activities, social network interactions) have been used to derive useful information about individual and group behaviors. A transaction record is typically identified by a transaction identifier and records a set of items involved the transaction. This record format is called "market basket" style data, as it is similar to a listing of the contents of a supermarket shopping cart of an individual shopper. A transactions database contains a large set of transaction records. Data mining tools have been developed for extracting frequently occurring groups of items ("itemsets") from conventional transactions databases. There has been some work in using data mining techniques in the image collection domain. For example, see U.S. Patent Application Publication 2011/0072047 to Wang et al., entitled "INTEREST LEARNING FROM AN IMAGE COLLECTION FOR ADVERTISING;" and see U.S. Pat. No. 6,598,054, entitled "SYSTEM AND METHOD FOR CLUSTERING DATA OBJECTS IN A COLLECTION," to Schuetze et al.; and see U.S. Patent Application Publication 2008/0275861 to Baluja et al., entitled "INFERRING USER INTERESTS."

SUMMARY OF THE INVENTION

According to one embodiment of the present invention, a predictive curator analyzes a user's media assets, transaction data, calendar entries, trends, behavioral patterns to predict and pre-emptively build digital media-centric products using the user's collections of images, with minimal or no active participation by the user. The user's collections of media assets may be retrieved from files on the user's device, cloud-based photo library, or other libraries shared among other individuals and grouped into thematic products. Based on analysis of the user's collections and on-line behaviors, the predictive curator may estimate types and volumes of potential media-centric products, and the resources needed for producing and distributing such media-centric products for a projected period of time.

According to one embodiment of the present invention, the "virtual curator" may take the form of a graphical or animated persona for augmenting and managing interactions between the user and the system managing the user's stored media assets. The virtual curator can assume one of many personas, as appropriate, with each user. For example, the virtual curator can be presented as an avatar-animated character in an icon, or as an icon that floats around the screen. The virtual curator can also interact with the user via text messaging, or audio messaging.

According to one embodiment of the present invention, the curator performs co-occurrence tagging to facilitate searching of the media assets. To provide seed terms for tagging, the curator can take advantage of knowledge embedded in social network comments, and individuals and predominate objects recognized in the media assets themselves. The curator can also take advantage of co-occurrence terms in associated users' collections for matching and correlation.

The present invention is better understood upon consideration of the detailed description below in conjunction with the accompanying drawings.

BRIEF DESCRIPTION OF THE DRAWINGS

FIGS. 9a and 9b show two forms that the curator may present to a user to customize a greeting card to be created, in accordance with one embodiment of the present invention.

FIG. 10a shows a look-up table that can be used by the curator to a profile of the desired product, according to one embodiment of the present invention.

FIG. 10b shows components of a greeting card that can be selected based on the values assigned to one or more of the profile categories, according to one embodiment of the invention.

DETAILED DESCRIPTION OF THE INVENTION

Whether for lack of interest, ability, creativity, imagination, time, or skill required, a user is often reluctant to manually search his or her image collections. The present invention provides a "predictive curator" which is an application program with a graphical user interface ("GUI") that communicates between the user and image analysis and product selection application programs. The curator organizes and manages the user's audio and visual media assets (e.g., the user's collections of pictures, music, movies, and TV shows) based on learning about the user from these assets and other data (e.g., demographic information and personal style preferences). The curator may also identify opportunities for creating compelling media-based products.

Figure 1:
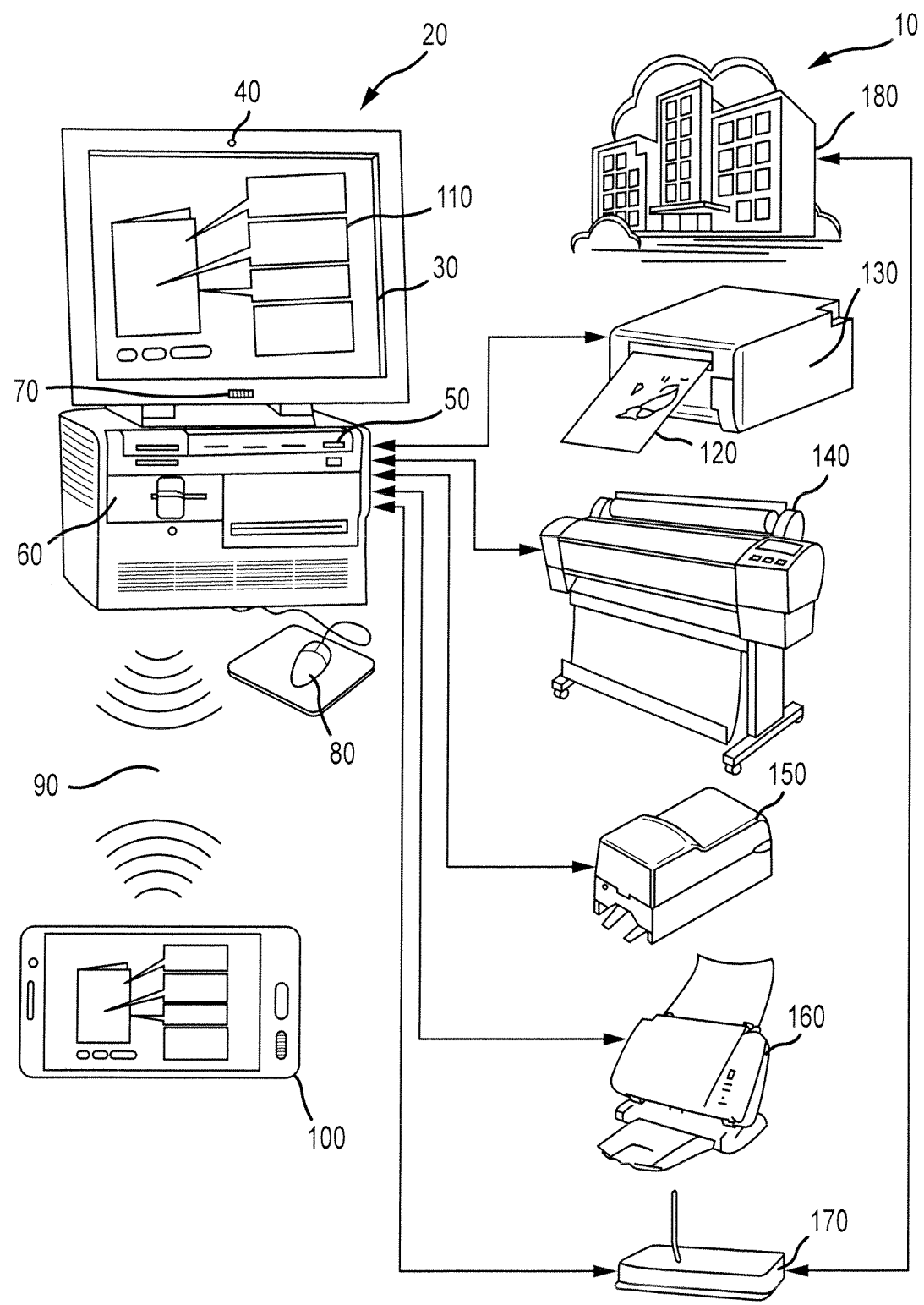
FIG. 1 is an overview of a system 10 in which a predictive curator may be implemented, in accordance with one embodiment of the present invention.

FIG. 1 is an overview of a system 10 in which a predictive curator may be implemented, in accordance with one embodiment of the present invention. As shown in FIG. 1, the predictive curator of the present invention may interact with a user via the user's computing devices. In FIG. 1, for example, the user's computing devices may include mobile device 100 (e.g., a smartphone or a tablet computer) and desktop device 20, which communicate with each other through a wireless link 90 (e.g., Bluetooth or WiFi). On desktop device 20, the user may interact with the curator through GUI 110, which is displayed on graphical display 70 and has access to peripheral devices, such as camera 40, memory card reader 60 and output devices 130, 140, 150 and 160. Output devices 130, 140, 150 and 160 may be, for example, printers of various types, including printers suitable for printing photographs and 3-D printers. In FIG. 1, desktop devices also has access to router 10 which provides access to a wide area computer network (e.g., the internet), through which the curator, running on desktop device 20 or mobile device 100, may access and make use of remote computing resource 10 (e.g., remote server 180). System 10 can be embodied as a personal computer system or as a retail photo kiosk system.

Significantly, according to one embodiment of the present invention, the user is provided a timely presentation of important images and potential photo-centric products incorporating the user's own relevant multimedia assets, without triggering any of the user's real or imagined privacy concerns. In some instances, such products may be created using output devices 130, 140, 150 and 160, as illustrated in FIG. 1. The present invention also provides the user with a creative, expressive opportunity to recognize and memorialize important life events by transforming what would otherwise be an involved craft project into a personalized shopping experience.

Figure 2A:
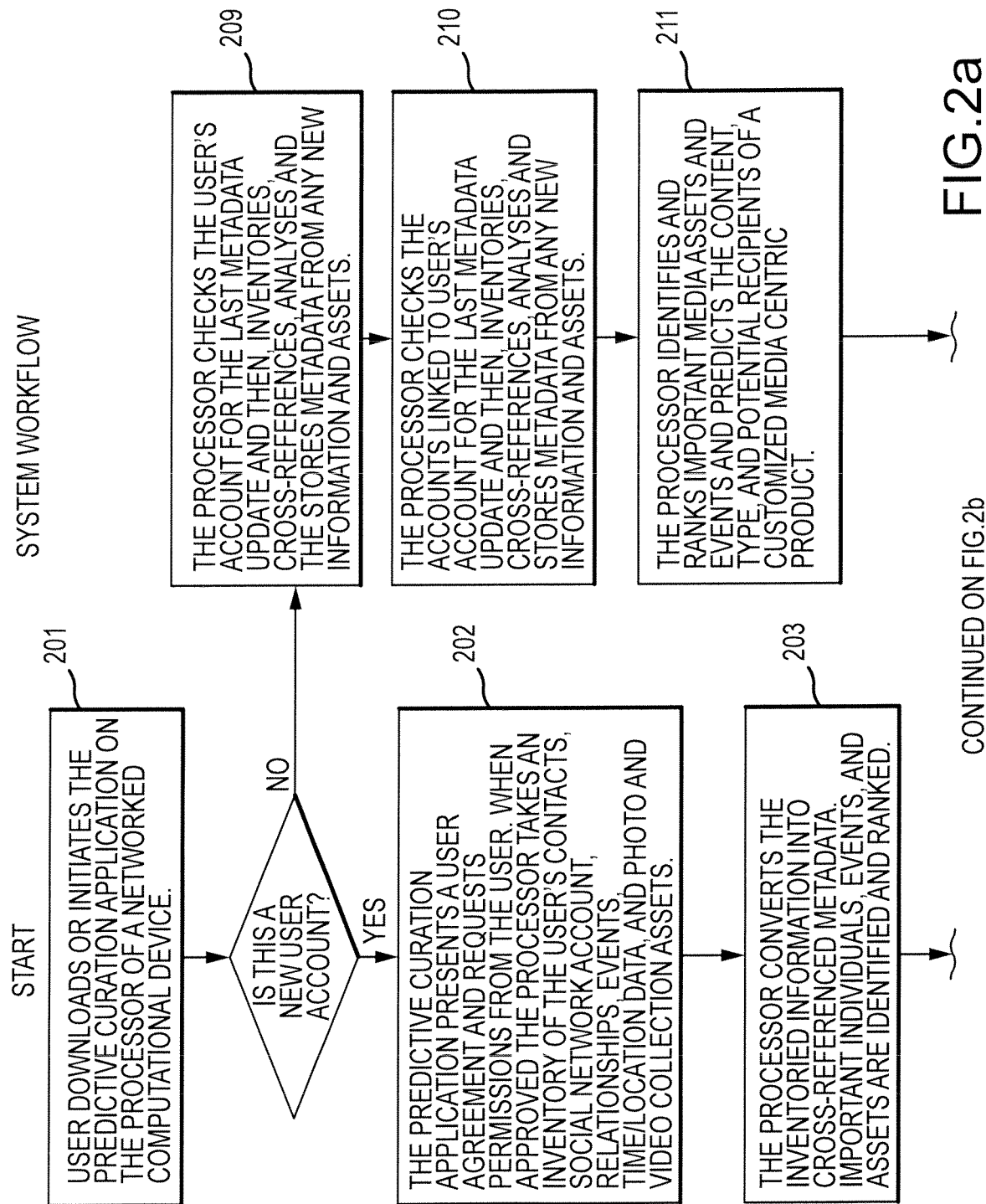
FIGS. 2a and 2b are flow charts that illustrate the work flow of a curator according to one embodiment of the present invention.
Figure 2B:
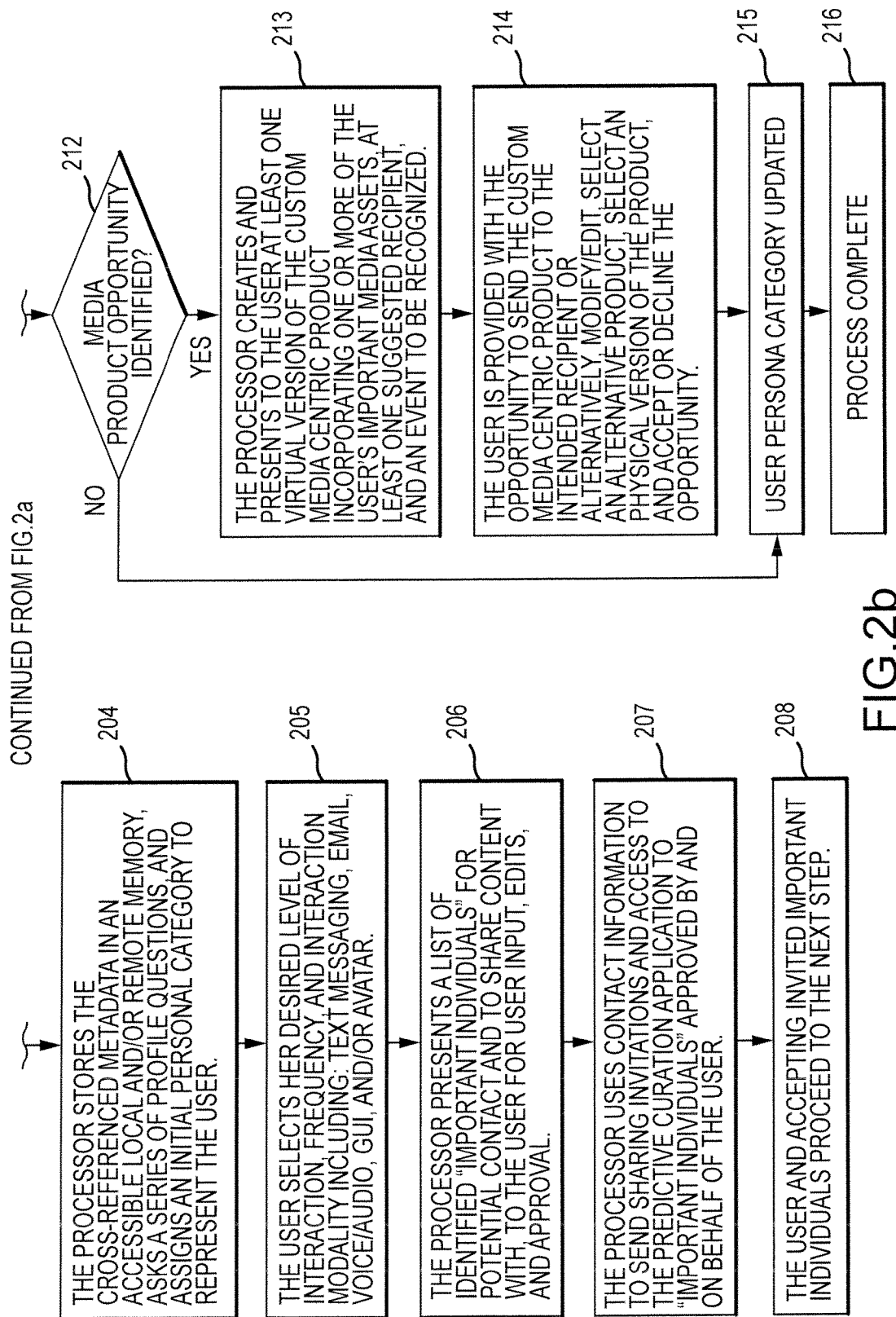
Figure 5A:
FIGS. 5a, 5b, 5c and 5d show various examples of interaction between the predictive curator and the user in the course of the curator's work flow, according to one embodiment of the present invention.
Figure 5B:
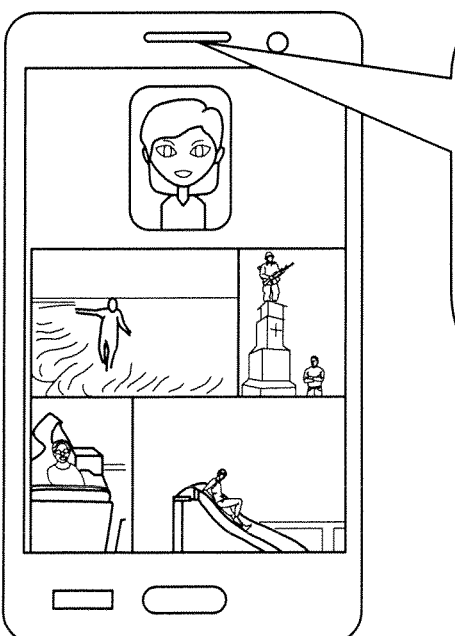

FIGS. 2a and 2b are flow charts that illustrate the work flow of a curator according to one embodiment of the present invention. As shown in FIG. 2a, at step 201, a user initiates the curator to run on a computational device. In some embodiments, the curator may be downloaded from a vendor's server on the internet. When the curator is initiated for the first time, at step 202, the curator presents to the user a service agreement to which the user must consent. FIG. 5a shows the curator, assuming a persona "Veronica" interacts by voice with the user to introduce itself and to obtain permission to proceed as a curator for the user's media assets, in accordance with one embodiment of the present invention. Thereafter, the user provides the curator permission to access the user's contacts, social network accounts, relationships, event calendar, time and location data, and collected multimedia assets. FIG. 5b shows that the curator, after taking an inventory of the user's media assets locally and on social media, requests by voice message the user's permission to process the media assets and social interactions on social media, in accordance with one embodiment of the present invention.

Figure 5C:
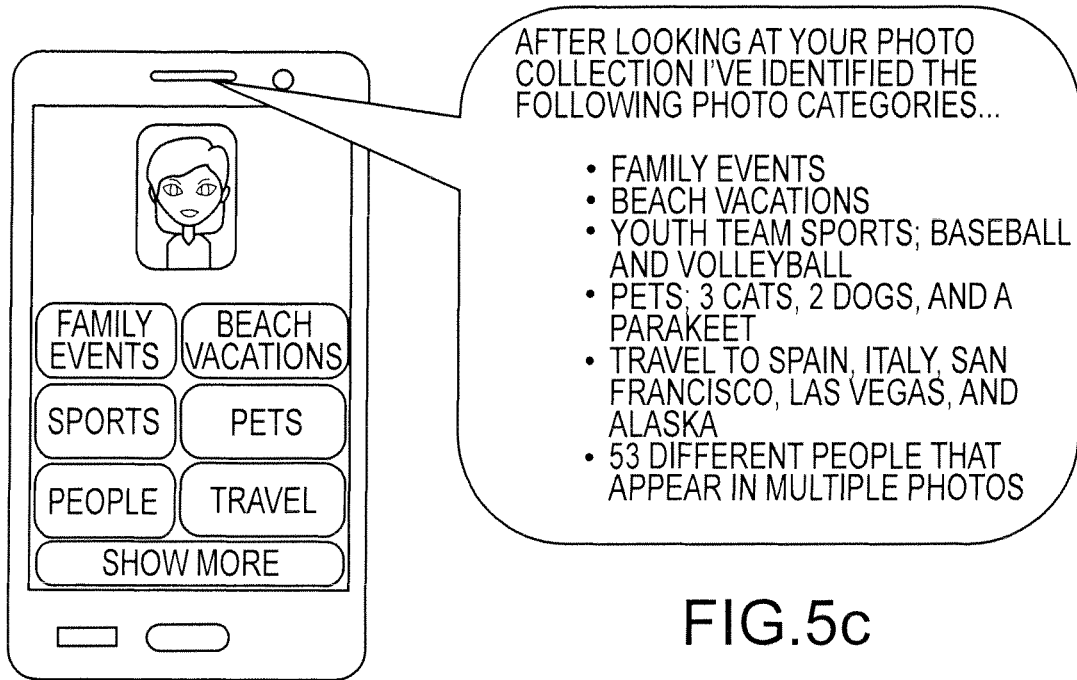

At step 203, the curator processes the information provided by the user to create metadata for its use. Such metadata may include, for example, metadata that encompasses the multimedia assets, significant individuals and events. The processing that creates such cross-referenced or indexed metadata are provided in greater details below. FIG. 5c shows the curator, having processed the user's multimedia assets and social media interactions, reports its finding by voice message to the user, according to one embodiment of the present invention.

At step 204, the curator stores the created metadata for easy access. The data may be stored locally, remotely or both (e.g., on desktop device 20 or remote computing resource 10 of FIG. 1). At this time, i.e., at step 204, the curator may interact with the user to obtain further information about the user and to create a profile based on the information retrieved from the user or from the metadata derived from processing the user's information obtained in step 202. The curator may assign the user to a persona category, as discussed in further detail below.

At step 205, the user selects a desired level of interaction with the curator, which may include, for example, the frequency of interaction and one or more modalities of interaction (e.g., text messages, email, voice or audio messages, over GUI or through an avatar). At step 206, the user may authorize the curator to interact with one or more of the significant individuals identified in step 203 for interaction (e.g., sharing of the user's multimedia assets). At step 207, based on the user's approval at step 206, the curator may contact the significant individuals to share the multimedia assets, or to introduce the predictive curator application program. At step 208, the curator then returns to step 201.

Figure 5D:
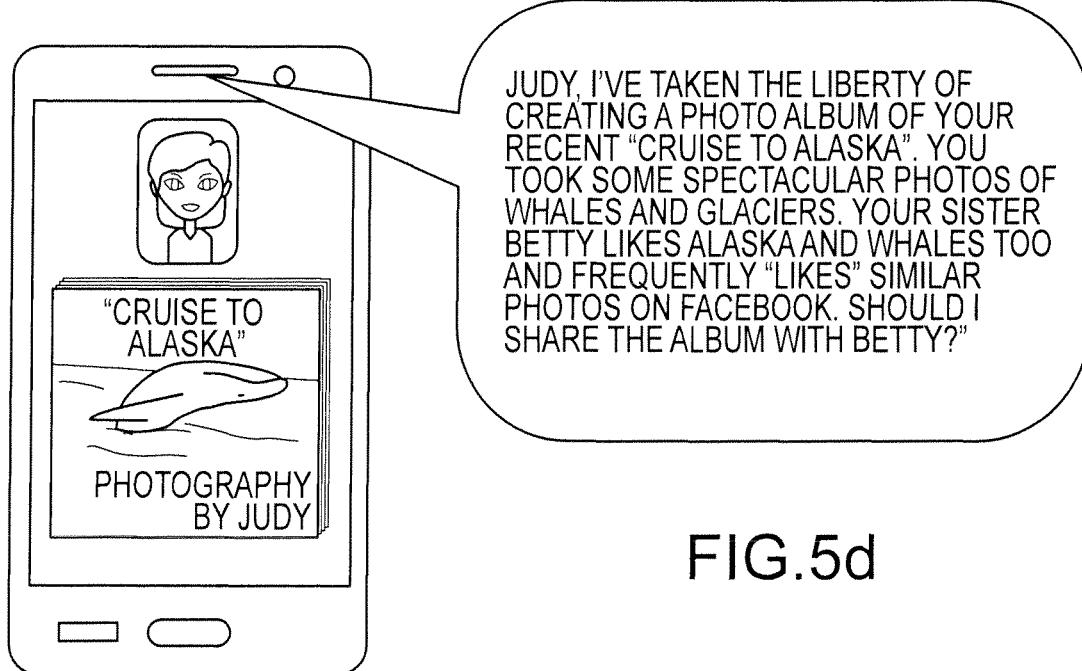

After the initial contact of steps 202-208, initiation of the curator at step 201 leads the curator to step 209. At steps 209-210, the curator processes any newly acquired multimedia assets and metadata in the manner already described with respect to steps 202-203. At step 211, based on processing the user's media assets, the curator may prepare one or more customized media-centric products to be offered to the user or one or more of the significant individuals. (Each customized media-centric product, e.g., a photo album, incorporates one or more of the user's media assets.) Some of the methods used by the curator to predict the content, the relevant events and the potential recipient or recipients for these products are disclosed in further detailed below. If the curator, at step 212, determines an opportunity to present one of the customized media-centric products is realized (e.g., a week before a recipient's birthday), at step 213, the curator may create and present a virtual version of the customized media-centric product to the user together with one or more suggested recipients and the event or occasion on which to present the customized media-centric product. (A virtual version of the product is a computer-model of the product, so as to allow the user to examine, visualize, edit or otherwise modify the product through the curator's GUI.) FIG. 5d shows an example in which the curator recognizes an opportunity to share a media-centric product (e.g., a photo album) with one of the user's significant individuals (e.g., the user's sister). In FIG. 5d, the user seeks the user's consent to share that media-centric product, according to one embodiment of the present invention.

Figure 11:
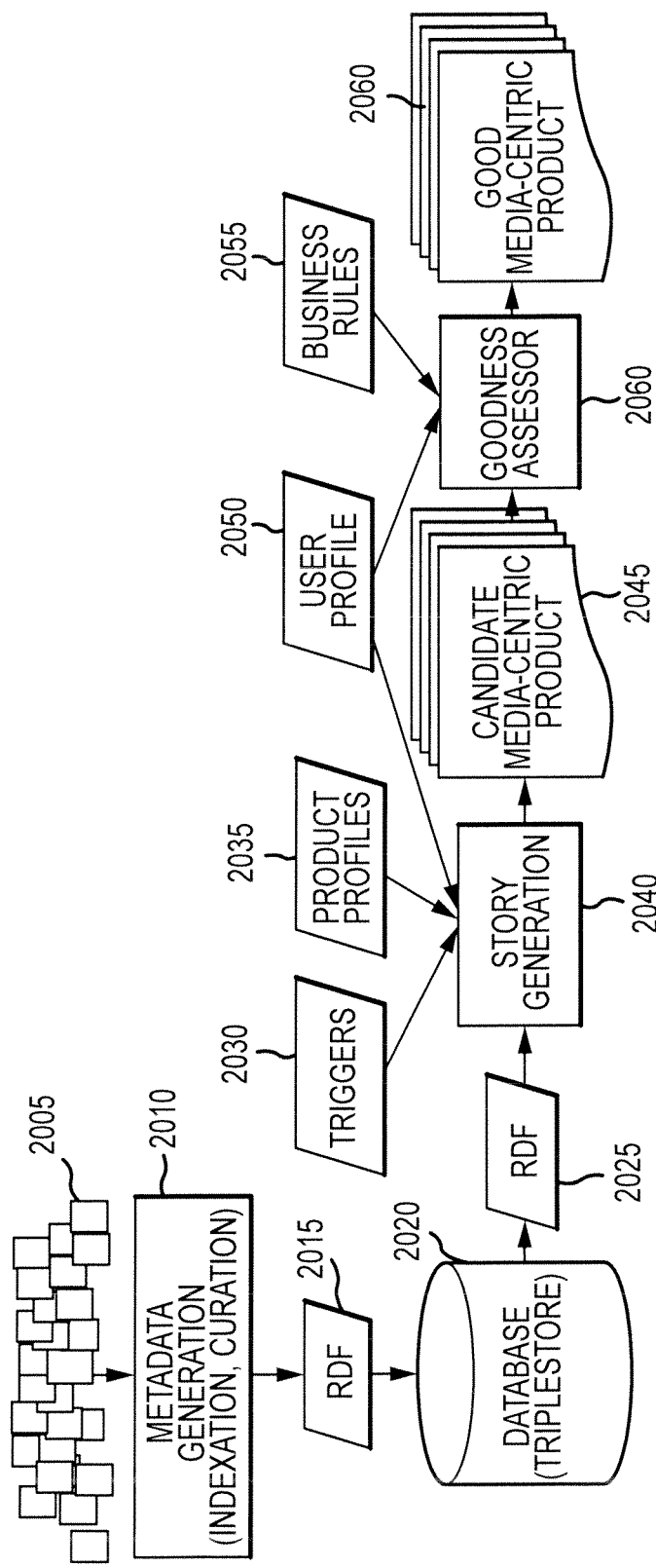
FIG. 11 elaborates steps 209-212 in the flow chart of FIGS. 2a and 2b, according to one embodiment of the present invention.

In one embodiment, steps 209-212 can be further described with reference to FIG. 11. The assets referenced in steps 209 and steps 210 from FIG. 2a are collectively shown as assets 2005 in FIG. 11. Analyzing assets 2005 by metadata generation process 2010 yields metadata 2015, which may be represented according to the industry-standard data model RDF (Resource Description Framework), and which may be stored in database 2020. Metadata generation is further described below. Databases designed for storing RDF data, such as database 2020, are known in the industry as triplestores. The triplestore constructs the appropriate auxiliary indices for efficient data retrieval. Step 211 of FIG. 2a itself can be described in further detail. For example, the process of identifying and ranking important media assets, known as "story generation" begins with story generation component 2040. In one embodiment, a story is merely a particular grouping and prioritization of a set of assets. Different algorithms may be used to generate different story types. This embodiment may support a variety of story generation algorithms. The most basic algorithm groups assets temporally, but in a hierarchical manner, so that the grouping reflects an event structure. For example, assets captured over a multi-day vacation may correspond to a single "super-event" and assets captured each day might correspond to separate "events." The assets belonging to an event may be further classified according to separate subevents, which correspond to different activities that occur within the event. Subevents may be further organized based upon degrees of similarity between adjacent images.

A second algorithm for story generation organizes assets thematically, by identifying a common theme. Theme identification may be accomplished, for example, using frequent item set mining (described subsequently in more detail). Other algorithms may use alternative grouping mechanisms. Each algorithm will further prioritize each asset based upon characteristics of the asset relative to the story type.

The operation of Step 211 of FIG. 2a (e.g., initiation of story generation component 2040) is precipitated by a trigger in trigger set 2030. The trigger may be as simple as the receipt of new assets, as suggested by the workflow of FIG. 2a. However, step 211 may be activated by other triggers, including temporal triggers (e.g., someone's birthday is coming up), location triggers (the user is detected to be in proximity to a certain location), system triggers (e.g., a promotion on a certain type of product is to be run), and various combinations of these and other trigger classes.

The stories generated by story generation component 2040 are typically, although not necessarily, developed with a particular product class in mind. The process that associates a story with a particular product class is referred to as "curation," which preferably presents the story to the user in a visual form. A completely generic story may simply represent a grouping and prioritizing of a set of assets. The highest priority assets can then be shown to the user. Stories developed with a particular product in mind may only make sense when visualized in conjunction with that realized product. For example, one possible product is a twelve-month calendar. In that case, the story grouping and prioritization may be much more specific (e.g., the story is presented in the form of exactly twelve product groupings, and for each grouping, a single asset is given the highest priority). Such a story is best visualized as the product for which it was intended, e.g., as a calendar. Other possible product classes include collages and photobooks. Some product classes correspond to a single surface, such as a collage or photo mug; other product classes have multiple surfaces, such as photobooks or calendars. Story generation component 2040 of FIG. 11 uses product profiles 2035 as input to story algorithms when generating stories intended for specific product classes. Story generation may be further refined for a given user by reference to user profile 2050. A user profile may be referenced by a story generation algorithm to refine the grouping or prioritization process. For example, if a given user is known to like cats, then pictures of cats may receive a higher priority than pictures without cats. More generally knowledge of the places, the people, the activities and the things important to a given user can result in pictures portraying those places, people, activities or things receiving a higher priority than they would otherwise.

In one embodiment, story generation component 2040 may generate multiple candidate stories 2045 visualized by multiple candidate media-centric products. While these candidate media-centric products may be directly presented in visual form to the user, the possible candidate media-centric products may be first screened using goodness assessor 2060. Goodness assessor 2060 operates by combining user profile 2050 with business rules 2055 to filter the set of candidate media-centric products 2045 to result in a set of good media-centric products 2060. If a good media-centric product 2060 is identified under test 212 of FIG. 2b, for example, the processor creates and presents to the user a corresponding virtual version of the custom media-centric product, as shown in step 213 of FIG. 2b.

At step 214, the user authorizes the curator to send the customized media-centric product, after editing or modifying by the user, if desired, to the intended recipients. Alternatively, the user may be offered alternative customized media-centric products for selection.

The additional information obtained by the curators in steps 209-211 and 213-24 may be used at step 215 to update the user's assigned persona category. The work flow completes at step 216.

Along with recording video, sound, text, and still images, a capture device includes metadata associated with its sensors. For example, a cellular phone, tablet, or digital camera may include location data from a Global Positioning Systems (GPS) or cell tower triangulation, orientation and inertia sensors, or a digital compass, accurate automatically set and updated time and date, temperature and humidity, and data regarding peripheral devices with wireless or wired connections to the capture device. Such peripheral devices may include, for example, wearable health and physical activity devices that monitor physical activity levels and heart rates, remote cameras and microphones, and autonomous aerial drones that are directed from and connected to the capture device and which are capable of recording and transmitting video and high resolution still images in real time. In addition, data from aerial drones which operate autonomously, such as data from GPS, altitude sensors, inertial, orientation, and directional sensors, and gyroscopes, may also recordable. Some recorded metadata, such as GPS data, can be linked with information about the user (e.g., latitude and longitude information may be linked to a street address or map location).

According to one embodiment of the present invention, by examining other user information, the curator may associate or "tag" such a street address or map location with, for example, the user's home, a recreational property, a favorite camp ground, a trout fishing spot, or a hiking or mountain biking trail. In turn, such additional information provides further context regarding the user's life style and interests. After having been identified, analyzed, and cataloged, the curator may relate the metadata with the user's account, relationships, and significant events. Links to the media assets may be created, so as to facilitate access when needed (e.g., for sharing or to produce a customized media product). These tasks may be performed without requiring the user to establish a new or redundant storage for their media assets or personal content, thereby alleviating any privacy concern relating to their availability at a new or additional location.

In some embodiments, processing of the media assets (e.g., acquiring the recorded metadata, deriving the metadata from images of objects, people or scenes) may be carried out by temporarily uploading the media assets to a remote processor. In addition, to create virtual and physical products, multimedia assets may be uploaded as needed from related participating users for incorporation. These images and the related media-centric products may be stored for a fixed time period to allow additional orders to be placed.

To allow the media assets to be more searchable and to be able to recognize and correlate related events or individuals, "semantic tags" may be applied to the media assets. Such a technique is available from existing tools, such as Microsoft Corporation's "Computer Vision API" or "Clarifai". Clarifai creates a set of semantic labels or tags for a given image or video asset, with each label assigned an associated confidence score which indicates the probability that the tag is relevant to the image or video frame tagged. Clarifai uses a model that is based on deep learning, such that a feedback mechanism enables the system to improve its model over time.

In one embodiment, the tags assigned to an image indicate a degree of quality or "interestingness" of an image. Machine learning techniques may be used to correlate tags or sets of tags against references generated from actually assessed aesthetic quality or the level of general interestingness of a picture. This data may be further refined by personalizing the model for a given user or demographic. In addition to associating tags with individual images as done by e.g., Clarifai, tags may be associated with events. The set of tags associated with the images in an event may be processed to identify frequent tags, unusual tags or stop words using conventional document analysis techniques. From such processing, a profile for the event may be developed. Such a profile may include, for example, a set of tags characterizing the event and an assessment of the significance of the event. A user profile may be generated for each candidate set of images, and a metric may be developed to compare between user profiles.

In general, tags should have an ontological structure (e.g. as chess is a type of board game, the tag 'chess' should be understood to match the tag 'board game'). Tools such as WordNet and its direct or inherited hypernyms may be used to form an ontology. An ontology may also be built upon the concept expansion method, which is based upon domain-specific knowledge.

Using ground-truth data (i.e., actually tested data), we can generate profiles for predetermined event semantic classes, such as birthday parties or school recitals. From either a candidate single image or a set of images with a computed profile, one may algorithmically determine which of the predetermined semantic event classes best matches the candidate image or image set. Such determination enabling one or more semantic event classes to the candidate set to be assigned, together with an associated confidence score.

When classifying a set of images using this approach, the set of tags for a set of images is obtained from the union of the tags associated with the individual images, after possibly filtering out unusual or non-descriptive tags. The tags may be further weighted, based upon their frequency of occurrence and their associated confidence scores. The weighted set may be compared against reference profiles. When classifying a single image, the frequency of occurrence of each tag is one, but the confidence scores for the individual tags can still be used for profile comparison.

Once event tags are generated for images of a collection—including tags for hierarchical event classes—the tag sets be used (a) for identifying thematic groupings of events; (b) as a component of the thematic grouping algorithm, (e.g., as one of the features considered by a frequent itemset mining algorithm, see below); and (c) for a method in which thematic groupings of events is obtained, such as performed in (b) but without considering tags, followed by processing each theme to obtain tags for each thematic group independently. The resulting tags associated with an individual thematic group can then be used to determine significance or otherwise score a set of thematic groupings. This approach allows one to make a collage from a set of thematic groups without knowledge of which thematic grouping or groupings are most important. Thematic groupings may be ranked, for example, by considering the uniqueness of the tags, as measured either against the individual's collection, or a subset of the collection, or as measured against other users. Alternatively, one can define an expert system based on priori knowledge of tag profiles of higher value themes. Over time, the tag sets or profiles that are of greatest interest to a particular user may be learned. For example, for a given user, the curator may learn that dog or pet-centric images or events are of higher import than other images or events. For another user, the curator may learn that abstract tags such as "love" are of higher value.

Learning may be accomplished by examining usage patterns. For example, if a user posts an album on a social media network in which there are subsets of images that are captured at different times, one may infer that the subsets represent thematic groupings. By running a thematic grouping algorithm on the subsets, the relative importance of the thematic groupings may be obtained. For example, an album including baby images with a different pose each month can be so tagged to identify a thematic grouping. Such tags may facilitate searches (e.g., to find similar albums taken by others in a social network), and for relevance reasons. For example, if one person shows affinity to pictures of a particular theme, (e.g., frequently "likes" pictures of thematic group), the person may be alerted to additional pictures of the theme as they are added to the album. In this application, the semantics of the actual tags are irrelevant; the value of the approach is realized by grouping of similar (i.e., highly matching) tag sets or profiles.

Tags may be used to help identify event boundaries, augments the methods that use visual similarity and temporal event clustering, as visual similarity metrics are sometimes inaccurate. A collection of images may contain pictures captured by different individuals at different locations for overlapping events. The use of semantic labels may provide improved event segmentation, including the ability to support parallel events. Tags are also useful in identifying recurring events based on identifying sets of images having the same tag sets. Such recurring events may be prioritized based upon the tags. For example, pictures that are tagged to have been taken at a park in July become more significant if there are similar such pictures taken every year. The importance of certain tags may be determined, for example, with reference to aggregated results from other users (e.g., if a large number of people find birthday pictures to be important, then birthday pictures for a particular user can be deemed important). Of course, the actual weight relevant to a user may be learned over time based on user feedback. Alternatively, when the tags associated with an event are unusual relative to other events, then that may indicate the event is significant. Of course, the importance of any event may be derived from multiple indicia. Identification of significant or important event may be can be further enhanced by filtering out infrequently occurring but insignificant events. Such filtering may be developed based on aggregate behavior extracted from multiple collections. For example, filtering may reduce the effects of a few pictures of washing machines taken from an isolated appliance shopping event. Conversely one may have a couple of pictures of a school bus. Such pictures, perhaps representing the first day of school, may be significant. Filters may be developed using expert knowledge, or obtained from the aggregate (e.g., one may create filters by generating tag sets for the pictures people post on social media networks).

The tags may be used to suggest to a user commemorative photographic products. For example, when it is learned that a user takes pictures of pumpkins every fall, the curator may automatically put together a collage of the consumer's best pumpkin shots over the years. Alternatively, the curator may remind people to take certain types of pictures relevant to a particular location or around a particular date. For example, the curator may remind people to take their annual pumpkin shoot in October. In some instances, while high-level classification (e.g., a "pumpkin shoot") is typically difficult to infer, the reminder need only take the form of displaying example pictures from past events.

The curator may also suggest usage for an image or a set of images based on the set of associated tags. In one embodiment, images that have been posted by the user on social media may be referenced for tagging other images. Suppose the images that have been posted to social media have been labeled "second". The "second collection" may include other previously captured or unprocessed images. Access to the user's social media account allows the curator to examine associated metadata such as "likes", emotions, comments and other metadata that have been associated with those images posted on the social media. After tags have been assigned to the newly captured or otherwise unprocessed images, the curator may compare the generated tags with the tags in the second collection to identify similarly tagged images in the second collection. If the curator finds that a given image has a set of tags that correspond to tags of a set of previously shared images, and if the previously shared images tend to be shared with certain social media groups, the curator may suggest sharing of the present image with the same social media groups. Further, if the previously shared images tend to be well-received ("liked") by a particular subset of the social media groups, the curator will highlight the present image for sharing in particular with that subset of social media groups (or score it high on corresponding newsfeeds). The curator may detect a usage pattern of the previously shared images and suggest the present image for the same usage.

Of course, images need not be confined to a single collection. The curator may create different image collections that correspond to different individuals or groups of individuals ("affinity groups"). By correlating tags in each collection, the curator may suggest usage of images or activities based on their affinity group or upcoming events identified in the affinity group.

In addition to tagging based on identification in a thematic algorithm (e.g., using frequent itemset mining, described below), groups may also be formed simply based on one or two features, such as place or location. In combination with ontological reasoning and with reference to other auxiliary data, such groups enable one to infer characteristics associated with a place. For example, when the tags on pictures from a known location type (e.g., a zoo) are found to closely correlate with a set of closely matching tags from another location, one can infer that the other location may be of the same type (i.e., also a zoo).

Although semantic tags are discussed above primarily in conjunction with tagging events, the same method is equally applicable to classifying activities. For example, when certain tags are typically associated with a particular type of activity (e.g., Little League games), one may apply the same tags to another set of similar pictures (i.e., as also a Little League game). The set being characterized might be from an event, but could also be some other collection (e.g., a parent saving the best pictures from a number of Little League games).

To accomplish its tasks, the curator may also use rule sets, dynamic learning, or combinations of these and other suitable techniques. For example, the curator may use keyword co-occurrence techniques for correlation among the media assets.

Figure 3:
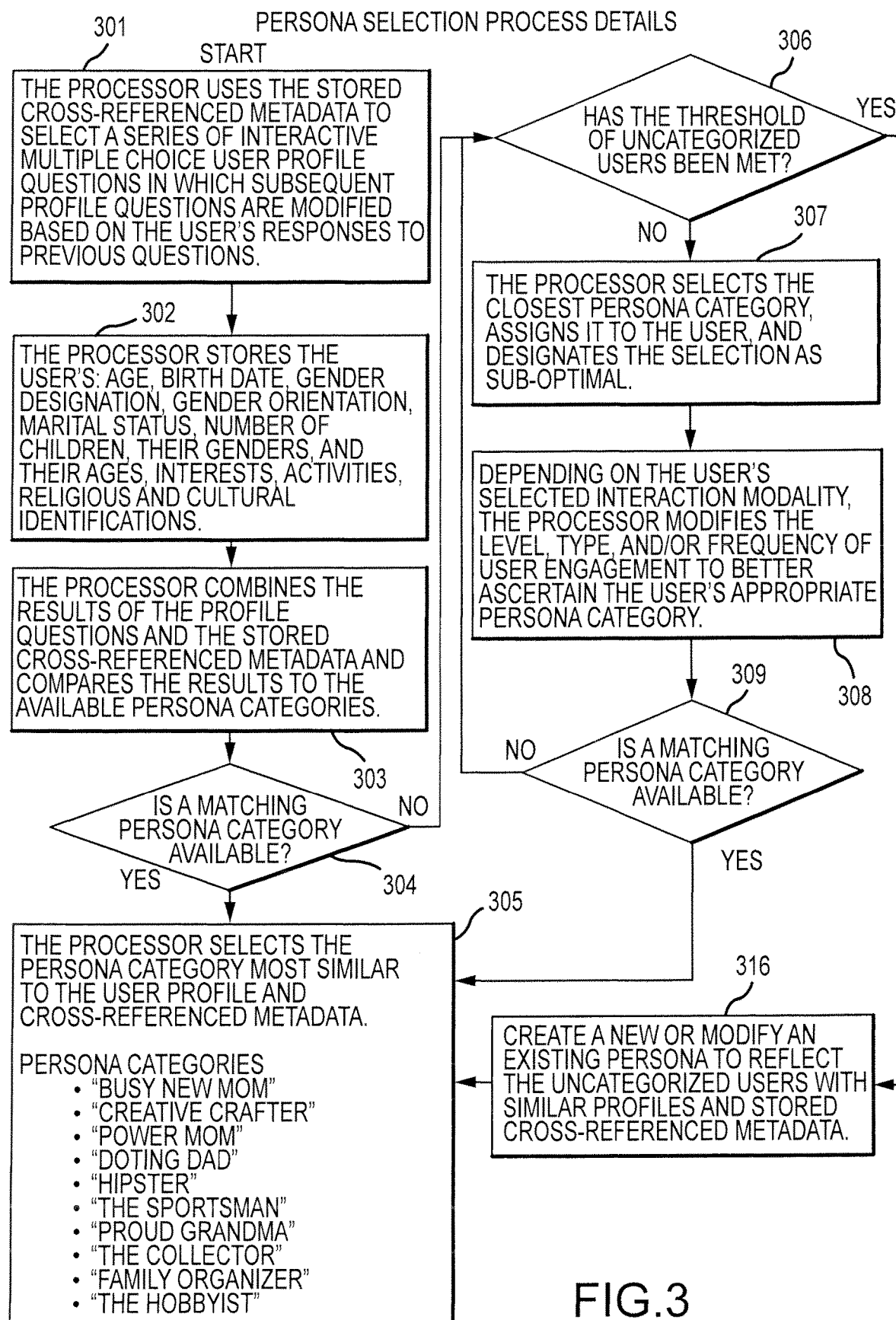
FIG. 3 is a flow chart showing how a persona may be selected for the user, according to one embodiment of the present invention.

In some embodiments, comparing the user's image content and associated metadata to a set of pre-determined user profiles ("personas"), the curator may assign the user to a persona or persona category, so that functions associated with the assigned persona may be performed in conjunction with the user, as already mentioned above with respect to the flow charts of FIGS. 2a and 2b. FIG. 3 is a flow chart showing how a persona may be selected for the user, according to one embodiment of the present invention. As shown in FIG. 3, at step 301, the curator uses the stored cross-referenced metadata (e.g., the metadata created and stored at steps 203-204 of FIG. 2a) to draw up a questionnaire to query to the user. Based on the user's responses to the questionnaire and other information available to the curator, at step 302, the curator compiles personal information of the user and the significant individuals, such as age, birth date, gender, gender orientation, marital status, name and age of the spouse, number of children, their names, and ages, and the interests, activities, religious and cultural affiliations of every person concerned. At steps 303-305, using the data collected in steps 301-302, the curator matches the data to select a persona category for the user from a list of available person categories. Matching techniques used in some embodiments are described in further details below.

At step 306, if the data indicates that the user's profile is significantly different from any of the persona categories, the difference may be quantified and compared to a threshold. If the difference is sufficiently large, at step 310, the curator may create a new persona category for the user. The new persona category and its characteristic user profile may be used for future user classifications. Otherwise, at step 307, the curator selects the closest persona category for the user from the list of persona categories, while noting that the selection is "sub-optimal." At step 308, based on the selected sub-optimal persona category, the curator modifies its interaction modality and frequency with the user. Through further interaction with the user, the curator may obtain better information to more accurately match the user profile to an available persona category over time.

Each persona represents a number of useful user traits. For example, a user trait may be captured, for example, by maintaining an interest log. When certain classes of content (e.g., certain types of images or videos) are collected or used at frequencies, volumes, or percentages exceeding pre-determined thresholds, as identified from content analysis, social network posts, comments, likes, shares, the user's profile may include a trait that represents a specific interest (e.g. the user is deemed to like dogs, take trips, engage in engineering, or participate in boating, sports, or certain hobbies).

The following are some examples of personas that may be assigned based on photographs and videos in the user's media assets:

| Persona | Indicative Media Assets |
|---|---|
| "New Mom" | babies or toddlers, taking into account the number of individual babies or toddlers, and their ages. |
| "Animal Lover" | pets, cats, dogs, rodents, exotic birds, reptiles, or spiders in the media assets; may be further classified based on, for example, interests in specific breed types (e.g., Yellow Lab, German Shepard, Dachshund, Poodle, Pit Bull) |
| "Sports Fan" | academic, amateur, or professional sporting events, types of sport, and team emblems in the media assets. |
| "Outdoorsman" | recreational activities, such as fishing camping, hunting, hiking, cycling, travel, parties, or gardening. |
| "Photographer" | Flowers, landscapes, wildlife |
| "Crafter" | handmade items, quilts, pottery |
| "Hobbyist" | Redundant Objects (e.g., salt and pepper shakers, sports memorabilia, trophies and awards |
| "Activist" | Large crowds, hand-held signs or posters, people in uniform—"Socially Conscious/Recycler" or "Political Activist" based on text depicted on posters |
| "Naturalist" | Nature, wildlife, birder, and nature hikes. |
| "Traditionalist" | Family- or children-oriented, spiritual, holiday traditions and celebrations. |

Figure 4A:
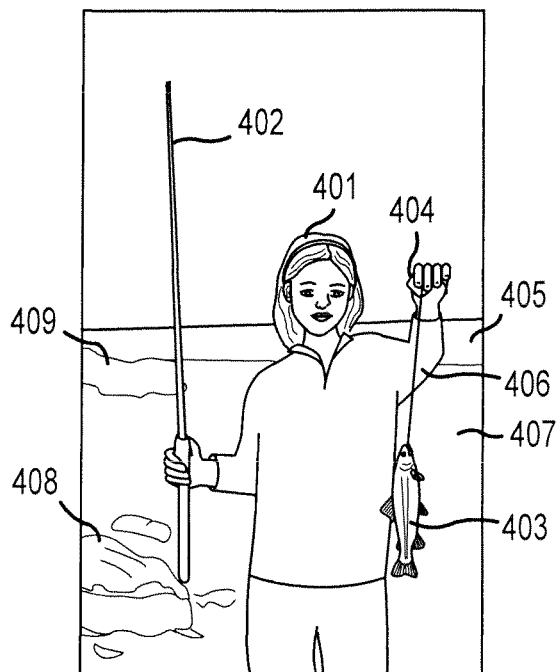
FIGS. 4a, 4b, 4c and 4d show image Content and contextual indications useful for learning a user profile, according to one embodiment of the present invention.

FIGS. 4a, 4b, 4c and 4d shows image Content and contextual indications useful for learning a user profile, according to one embodiment of the present invention. For example, the curator may identify from several images of a child fishing (e.g., one of which may be FIG. 4a, showing child 401, fishing rod 402, and fish 403)) that are taken within a short interval in time that are tagged with a GPS location corresponding to "Keuka Lake," which is a known recreational scenic location (e.g., waterfront or beach). The images may relate to an identified significant event (e.g., "catching a fish"). Techniques for identifying significant events may be found, for example, in U.S. Pat. No. 8,774,528, entitled "METHOD OF SELECTING IMPORTANT DIGITAL IMAGES" to Hibino et al. Salient recurring regions of interest and groups of digital images may be identified, for example, using techniques disclosed in U.S. Patent Application Publication 2015/0036931, entitled "SYSTEM AND METHOD FOR CREATING NAVIGABLE VIEWS" by A. Loui et al.

Such images may trigger the curator to initiate a user behavior and content analysis. The curator may use additional information which may be included from other user activities. For example, the curator may also learn from the user's multiple social media postings that child 401 has been identified as the user's 8-year old daughter; furthermore, the curator may also learn that the user has shared these images multiple times with individuals the user identifies as her mother and sister.

Figure 4C:
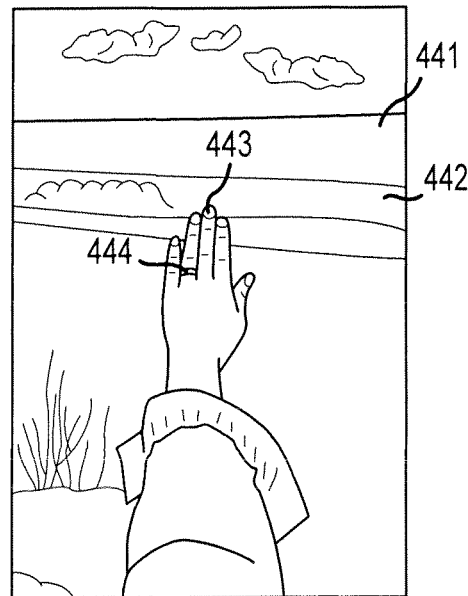
Figure 4B:
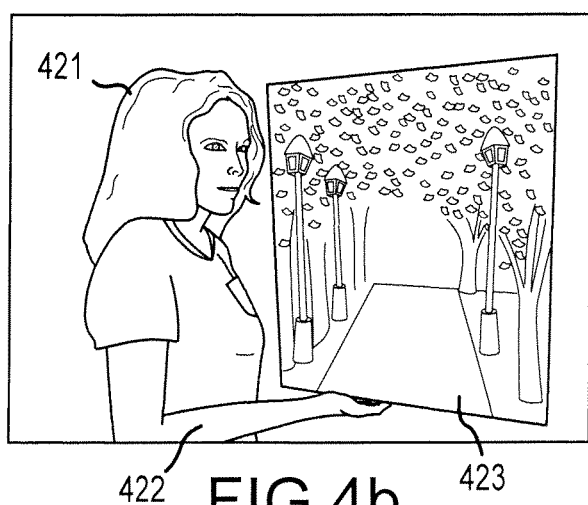
Figure 4D:
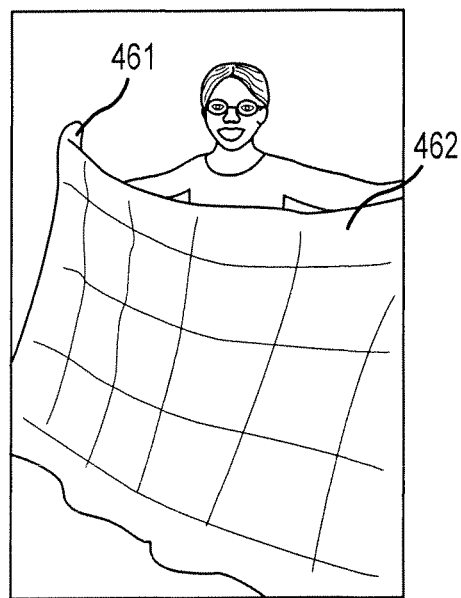

As another example, in FIG. 4c, the curator may recognize person 421 holding painting 423. The curator may predict that person 421—who the curator may be able to identify as the user—has painting as a hobby. Similarly, FIG. 4d, which shows the user holding quilt 462, allows the curator to predict that the user has quilting as another hobby. FIG. 4c shows left hand 443 having ring 444 on the third finger. The curator may predict from the image 4c that hand 443 belongs to a recently engaged person.

According to one embodiment of the present invention, user behavior and content may be analyzed using look-up tables of behaviors and content that are previously compiled or dynamically learned. Analysis may be performed for general categorization or persona identification or for specific purpose. From the content and metadata, the content may break down into categories, such as event types (e.g., family outing, sporting events), participants, location (e.g., ocean front, lake front, theme parks, camp grounds), general life-style categories (e.g., indoor, outdoor, group activities), and content-type (e.g., skiing, water sports, sailing boats). From the identified participants, the user or other individuals may be classified to demographical groups (e.g., "mother", "young child"). Similarly, the location may provide useful geographical information (e.g., home zip code). The content breakdown may provide information relevant to social or network profiles. The curator may also take advantage of the user's calendar and contact lists, which allows the curator to predict important events, family members, business contacts and friends.

Other indicators of user behavior can also provide information to create user profiles or personas or to assign individual users to such profiles or personas. Customer interviews, hobbies, relationship types, ethnic backgrounds, nationalities and national origins, computer familiarity, religious affiliations, political affiliations, preferred news sources, and blogs read by users all provide insights and can be used to assist in establishing a user profile or to assigning a persona to a user.

Many objects and landmarks in images may be automatically identified by image understanding algorithms, but automatically identifying individuals is usually not an easy task. However, there is academic research in relationship inference from proximity in photographs. Relationship inference may be achieved taking advantage of similar characteristics shared by related individuals, such as facial and physical features, skin tone, eye color, and hair color. Some relationships may be inferred based on relative ages (e.g., parent and grandparent). Certain types of formal photographs may be used to establish relationships (e.g., wedding photographs in a person's collection). Such formal photographs have familiar poses, e.g., the bride and the groom are at the center, and parents are likely to be standing next to the bride and groom. If the best man resembles the groom, there is a significant likelihood that he is the groom's brother. Parents are likely to resemble either the bride or the groom.

In some context, the garments, apparel or accessories of user, and of those with relationships to the user are informative, e.g., formal, casual, uniforms, avant-garde, free spirit, religious garb or head gear, jewelry, tattoos, hair styles, facial hair, climate-related garments (e.g., hats, gloves, coats, or bathing suits). Techniques for deriving information from apparels are disclosed, for example, in "Clothing Cosegmentation for Recognizing People," by Andrew C. Gallagher and Tsuhan Chen, CVPR 2008, and "Describing Clothing by Semantic Attributes," by Huizhong Chen, Andrew Gallagher and Bernd Girod, ECCV 2012

Additionally, less formal and more casual photographs (e.g., groups shots used to create holiday greeting cards) also provide valuable relationship and identity information. Digital versions of these cards are usually found in a user's collection of photographs and may include textual information such as, "Merry Christmas from The Hendersons". Using this example, if such a photograph includes a male adult and a female adult, accompanied by three children, it is reasonable to infer the picture depicts Mr. & Mrs. Henderson and their children, who are siblings of each other. The holiday card may also provide information to infer the religious or secular background of the holiday season. The relative ages of the depicted individuals may be determined using age calculating image understanding algorithms. In other photographs, co-workers, housemates, teammates, classmates, travel companions, relationships, relatives, random connections, or any other grouping may be inferred from their presence on the social network, from information or tags entered or the actions taken by users on the social networking service. Groupings may vary in granularity (e.g., specified individual connections in the social networking service, predefined groups of the user's connections, a particular genre of connections, the user's collected connections, all connections of the user's connections, or all users of the social networking service). Techniques applicable for group analysis may be found, for example, in "Understanding Images of Groups of People," by Andrew Gallagher and Tsuhan Chen CVPR 2009, and in "Seeing People in Social Context: Recognizing People and Social Relationships," by G Wang, A Gallagher, J Luo and D Forsyth, Computer Vision—ECCV 2010, pp. 169-182.

The nature and the relative closeness of the relationships can be inferred, although some relationships tend to be temporal, since many interpersonal relationships can be transient in nature. This may be true for friendships in general and is especially true for romantic relationships. The curator monitors the current status of relationships as indicated from social media reports and activities, or through other information sources (e.g., email, text, and telephone interactions). When the curator detects that a user is no longer in a romantic relationship, the curator will omit the former romantic partner in future curated content. Other relationship changes can be considered, depending on the natures of the relationships. The curator may follow certain general guidelines, e.g., friendships drift and break and family relationships tend to last. The curator may use data mining techniques to detect whether a friend or a relative is ill or has died by checking social media reports and activities (e.g., Facebook postings). Detected illness may trigger the curator to recommend a "get well soon" response, and a detected death may trigger the curator to recommend a retrospective on the relationship or a tribute.

Information regarding significant life events may also be collected from images. Events may be reoccurring or spontaneous. Some events may be identified by specific objects present (e.g., hats, decorations, cakes, roast turkey, hamburgers, or pizzas), whether it took place indoors or outdoors, or the presence of a barbecue grill. A selfie of the user (i.e., a picture taken by the user that includes himself in the picture) just finishing a marathon is probably a significant life event. In addition, when the capture device has also recorded contemporaneous activities (e.g., heart rates recorded by a wearable health or wellness device, such as a FitBit device, or pulse rates and blood flow rates extracted from videos using Eulerian Video Magnification techniques), the metadata may correlate with the picture or video of interest. Collecting such events and metadata over a time period may suggest to the user significant insights into helping the user maintain a healthy life style (e.g., interactions between the users' weights, heart rates, activity levels, moods, diet or sleep patterns at the times of the relevant life events recorded in the media assets).

The number of individuals present may also provide useful information in some cases. Techniques for inferring relationship and event types are disclosed, for example, in the article, entitled "Close & closer: discover social relationship from photo collections", by Wu, published in IEEE, ICME 2009, August 2009, pp. 1652-1655. In that article, the authors disclose using physical proximity in photographs as a surrogate or indication of relationship closeness.

Other events may be inferred based on the people at the event (e.g., celebrity, famous and infamous individuals, sports figures, actors, team mascots, politicians, and costumed characters). National, cultural, and religious holidays may be inferred from the user's background and geographic region. While some holidays are celebrated, others are ignored, or discouraged. For instance, Valentine's Day is strongly discouraged in India and Iran. The way different cultures and regions celebrate the same holiday also varies from solemn to festive. Presence of relatives, close friends, and old acquaintances may suggest family, school, or other social group reunions, for example. A vehicle-related event may be identified, of example, by the counts and mixes of vehicle types (e.g., luxury cars, antique cars, functional vehicles, recreational vehicles, off-road vehicles, motorcycles, Segways, hover boards, bicycles, boats, personal water crafts, canoes, kayaks, row boats, sailboats, wind surfers, aircraft, helicopters, and flying boats). Similarly, the presence of certain sporting equipment in abundant numbers may be informative (e.g., inline skates and tennis rackets). Concerts and concert types may be inferred by the presence, count, mix and proportions of musical instruments. The number of performers and the presence of various instrument types may suggest a band, an orchestra, a choir or a marching band, Individuals and objects in images and videos that cannot be identified with high confidence by automatic processing (e.g., based on image understanding algorithms) may be manually tagged. The curator may then inquire the user of the tagged items. The queries may be present using graphics, in which the curator may be presented as an avatar, or via more conventional text or audio messaging formats. The curator preferably initiates conversational interaction with the user to obviate the need for learning to navigate or use a GUI or workflow. During its interaction with the user, when the curator is unable to adequately respond to a user's request or comment, a remote operator or crowd-sourced operator may be summoned, so as to intervene and to temporarily take control to resolve the problem at hand. The user need not be made aware of the involvement of the remote operator, which may run in the background, as interaction with the user as the curator may still be handled by the curator front-end.

Figure 6A:
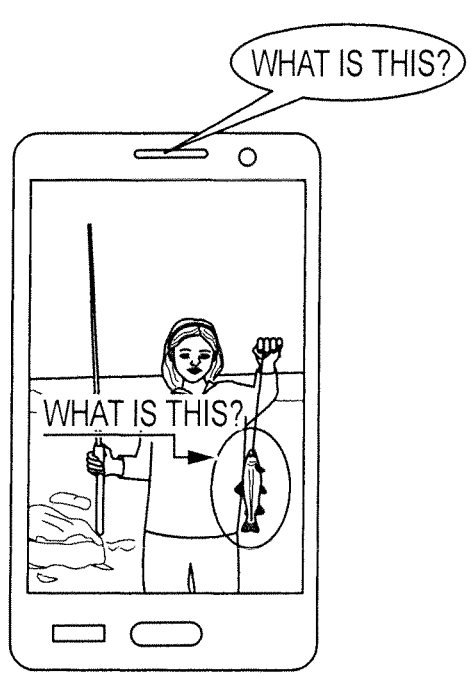
FIGS. 6a, 6b, 6c and 6d illustrate the tone of the questions that would be asked from two different personas, in according to one embodiment of the present invention.
Figure 6B:
Figure 6C:
Figure 6D:

In one embodiment, the curator selects a persona type for itself that is compatible with the demographic persona or user profile determined for the user. Of course, the selection of the curator's persona is preferably the user's selection, with options to modify or to select an alternative. FIGS. 8a, 8b, 8c and 8d show different curator personas that the curator may assume. Some examples are the "Helpful Friend", the "Professor", the "Personal Assistant", and the "Know-it-all Nerd", shown respectively in FIGS. 8a, 8b, 8c and 8d. Depending on which curator persona is adopted or selected by the user, the tone of the inquiry can styled more or less personal, technical or formal. FIGS. 6a, 6b, 6c and 6d illustrate the tone of the questions that would be asked from two different personas, in according to one embodiment of the present invention. For example, the avatar or GUI can inquire, "What is this?" under one curator persona (FIG. 6a), or less abruptly "What is the little girl is holding?" under another curator persona (FIG. 6b). Similarly, the avatar may inquire, "Who is this?" under one curator persona (FIG. 6c) or less abruptly "Who is this little girl?" under a different curator persona (FIG. 6d). The user may respond verbally, for example, which may then be converted to text using a voice-to-text algorithm or application.

Figure 7A:
FIGS. 7a, 7b, 7c and 7d illustrate the curator persona may ask questions about an image that incorporate already recognized or identified features in the image, in accordance with one embodiment of the present invention.
Figure 7B:
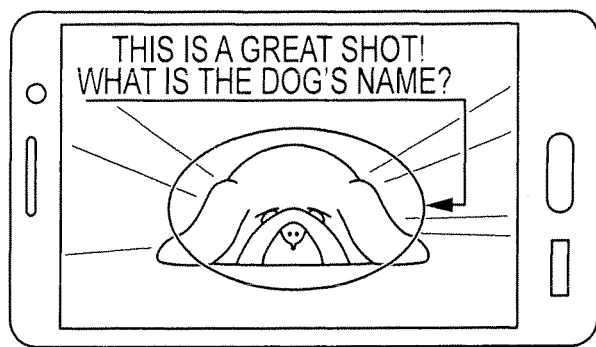
Figure 7C:
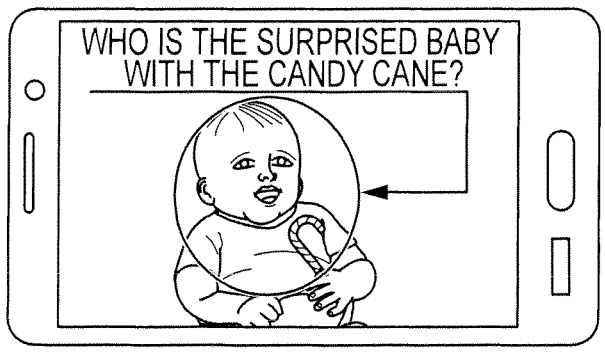
Figure 7D:
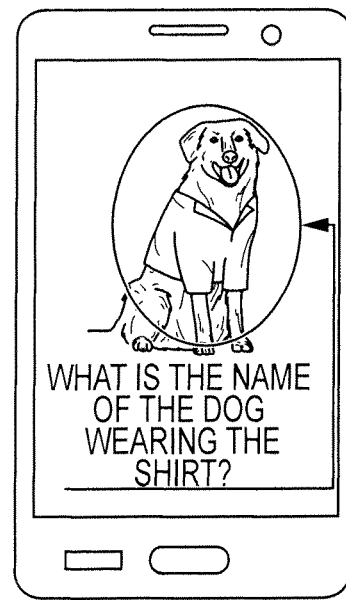
Figure 8A:
FIGS. 8a, 8b, 8c and 8d show different curator personas that the curator may assume, according to one embodiment of the present invention.
Figure 8B:
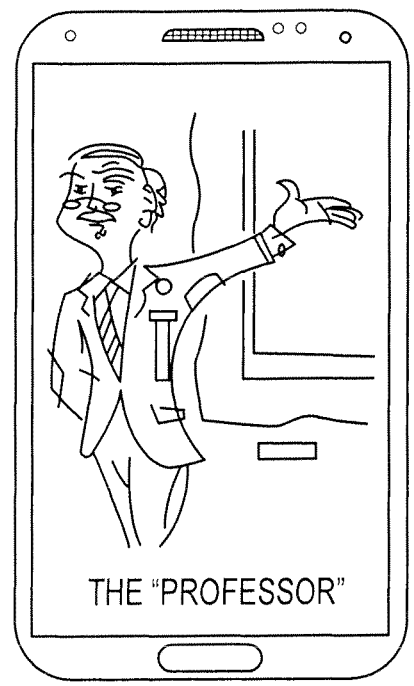
Figure 8C:
Figure 8D:
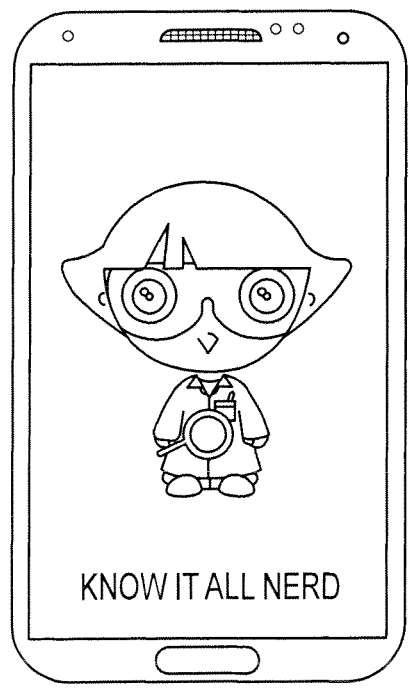

In some embodiments, the curator is capable of asking more sophisticated questions regarding an image, as more features in the image are recognized automatically or identified by interaction with the user. For example, FIGS. 7a, 7b, 7c and 7d illustrate the curator persona may ask questions about an image that incorporate already recognized or identified features in the image, in accordance with one embodiment of the present invention. In FIG. 7a, after learning that one of the features in the image is a "snow fort" (e.g., from a comment associated with posting of this image on social media), the curator may ask "Who is the child in the snow fort?" In FIG. 7b, the curator exclaims "This is a great shot! What is the dog's name?" In FIG. 7c, having recognized the facial expression of "surprise", the curator asks, "Who is the surprised baby with the candy cane?" Likewise, in FIG. 7d, the curator asks, "What is the name of the dog wearing the shirt?"

Alternatively, scenes, frames, and video clips containing objects and individuals to be identified may be forwarded for further analysis at a remote processor where greater image recognition abilities or resources exist, thereby augmenting the performance of the automatic recognition algorithms executed on the user device. Furthermore, images of objects and individuals to be identified may be presented for operator identification or crowd-sourced assisted identification. The curator may also use the remote processor for exchanging information with curators for related individuals (e.g., information that allows birthday-related products to be offered to a user's siblings or parents).

A number of techniques may be used simultaneously in content analysis for the curator to determine profiles of the individuals seen in the media assets and the relationships among them. For example, the curator may use regression analysis, which is a statistical modeling process that estimates relationships among variables. Regression analysis may provide a relationship between a dependent variable and one or more independent variables (referred to as "predictors"). Logical inference rules, ("If/then rules") may be employed. For example, when a user is frequently depicted in images with an identified dog or dogs in general, it may be appropriate to associate the user profile with "dog owner." It may also be appropriate to infer that the user is a "dog person," rather than a "cat person". In some instances, where the media assets show specialization (e.g., a preference to a particular breed, such as "Yellow Lab", "Chihuahua", "German Shepard", or "Pit Bull"), the user profile may be further associated with the specialization. In general, identification of objects in media assets recorded in various environments can be useful. For example, sewing machines, firearms, agricultural equipment, pets, livestock, apartment living, artwork all provide context and can better assist in identifying the proper user profile or "persona category".

The user profile may also take into consideration demographic, contact, and relationship information derived from the user's social network interactions (e.g., connections, activities, "checking-ins", "likes", "comments", sharing or postings of videos or photographs). Information obtained from the user's social network account provides indication as trend data of the user's lifestyle attitudes and preferences at the current time. The user's actual product purchases, user recommendations, and other e-commerce activities are also highly informative. By studying generic purchasing patterns and by monitoring successful and unsuccessful purchase behaviors regarding media-related products (e.g., photographic products), updating such behavior patterns on a continuous basis, associations between a behavioral indicator and interest in a potential photo product can be pre-established. For example, the user's accounts with an online marketplace (e.g., Amazon or Overstock) may be reviewed for the user's styles and activities, based on actual purchases and purchasing habits.

In addition, motion vector analysis of the video assets may reveal a preference for action (e.g., sports). Alternatively, the user's accounts with streaming vendors (e.g., Hulu, Netflix, or Amazon Prime) can be reviewed to determine the user's viewing interests. Simple movie genre preferences, such as comedy, romance, sci-fi, westerns, or documentaries, and any associated consumer ("star") ratings may contribute useful information to the user profile and may also be used to select and customize suitable media products to the user.

Retail businesses have used personas to represent customers. Creating such personas is a well-established marketing technique. A company often creates personas identified to various groups of customer types, the customer types characterizing the customers' motivations and obstacles. Such personas help the company understand the customers and help to develop strategies and techniques to overcome customer reticence with interventions, incentives, and tailored marketing communications. Personas also allow for different marketing messages to be presented to different individuals using the same platform. The frequency and channel of a given marketing message may be tailored to specific personas, and to enable accurately predicting sales based on prior sales. Internet advertising companies rely on personas developed from monitoring users' browsing history, social network activities, and any advertising or "pop-up ads" the users select or responded to or clicked on. Information derived from personas allows marketers to advertise their merchandise to a targeted and potentially interested audience.

Personas may be created and assigned with a hierarchical ontology. As data is collected from the user, the user's media collection and the user's media activities, a more specific persona is assigned or created. The persona type may have different levels with different granularities. For example, at level 1, a user may be assigned "Sports Enthusiast" persona based on the user's taking photographs at sporting events. The user may also be assigned, at level 2, a "Sports Mom" persona, when it is recognized that the user takes significant number of photographs of sporting events in which her children participate. The user may also be assigned, at level 3, a "Gymnast Mom", when it is recognized that a significant number of photographs are taken of the user's child participating in gymnastics.

Additional discussion regarding personas may be found, for example, in (a) the book "Psychological Types. Collected Works of C. G. Jung" by Jung, Carl Gustav (Aug. 1, 1971), published by the Princeton University Press (ISBN 0-691-09770-4); (b) the article "The Power of the Persona," by Rind, Bonnie, May 5, 2009; (c) "Persona Management," by Bob Pike, published in Computer Fraud & Security 2010 (11): 11-15. doi:10.1016/S1361-3723(10)70145-7; (d) the article "The origin of personas," by Alan Copper, Cooper Journal, May 15, 2008; and (e) "Getting from research to personas: harnessing the power of data," by Kim Goodwin. Cooper Journal, May 15, 2008.

Creating a series of personas for users allows a company to group and categorize potential customers' and actual customers' purchasing behavior and activities. Personas are surrogates for in-depth user profiles and provide a company an ability to tailor the marketing message and to produce product offerings to selected groups of potential consumers. Personas are also useful if only incomplete profile information is available for particular users and new users. Personas can provide information on likely or preferred product categories, such as photo calendars, posters, photo albums, or digital slide shows. This information allows a company to appropriately scale up and stock the materials, media, and products based on projected sales to the various customer groups represented by their corresponding personas and to customize individual products with digital multimedia assets from the individual user's own multimedia assets or accessible assets from other users.

These personas can also be used to aggregate user behaviors and to make anonymous any individual user's actual behavior. The resulting information can be used to plan for manufacturing and distribution. In addition, this information can be provided to other advertisers and manufacturers. The accumulated buying, social network interaction, viewing and listening histories may be used to determine or affect a "persona" model, which serves as a surrogate for the user or a new user group. Once categorized, the personal data of a user need not be kept by the company and can stay resident with the user. Important dates and relationships and access to all image accounts may be used, with user permissions, so that potential photographic products can be offered in a timely manner. The number of personas available and the persona categories available for assignment to a user can be modified based on product sales, user feedback, and other factors. Special promotions and offers can be provided to different persona groups.

As mentioned above, the user profile may be actively created by user submission (e.g., by filling out a form), an interview with a human or a digital avatar, or a series of interactive text or audio questions. Of course, personas can be created in advance or created dynamically from observing behaviors of the participating users, or modified to reflect changing user behaviors. A user persona is a surrogate for the user profile and allows the product or service provider to gauge and estimate the shares of various user types in its user base. In addition, actively monitoring the effectiveness of persona classifications with target users can provide quantitative results into what works for your target users and what doesn't. Other techniques for developing personas include, for example, sentiment analysis or "opinion mining", which is a technique for assessing consumers' emotional states. Sentiment analysis provides context for text provided by users from comments, blogs, reviews, and posts on social networks. Sentiment analysis processes text information to determine a sentiment, theme, interest, concern, or other subjective information regarding objects such as a topic, people of interest, brands, or companies.

According to one embodiment of the present invention, each user is assigned to one or more personas. To preserve anonymity when using services from other application programs, only the curator monitors the user's account activities, the user's identity, account information and other personal or confidential information are made anonymous before providing them to other application programs, such as content analysis or social network activity analysis. The curator retains control of the user's identity information and individual photographic product purchase history, for example. A single individual may be associated with multiple personas using persona hierarchies or a system of related personas. For example, an individual who is both a young mother and a grammar school teacher may be categorized by separate personas to differentiate the relationships and events of her personal life and the events and relationships of her professional ones (e.g., school-related events would be presented separately from personal events). The curator's text messages or pop-up ads related to these personas, while appearing on the same user's device, would be differentiated (e.g., addressing the user differently). For example, the curator would address the teacher or professional persona as "Mrs. Johnson", while the young mother persona would be addressed as "Betty". Personas can be purchased, acquired, or shared on social networks, search engines, or shopping service providers.

In addition to predetermined user profiles or personas, the system may dynamically recognize and assign users to profiles that are learned over time. In one embodiment, the method of frequent itemset mining identifies common characteristics for sets of users. For example, the system may recognize as a class of users females age 20 to 35 who frequently photograph infants. While this set of users is similar to the "New Mom" persona identified previously, this set of users was dynamically learned by the system, without an express association of a predefined label (e.g., "New Mom") with the persona, and without participation by a human operator or system designer to define the persona. When a sufficient number of users fit such a dynamically discovered profile, the system may monitor the behavior of the users, so as to learn more and more characteristics that can be associated with the persona.

In an alternative embodiment, the system uses a simplified form of frequent itemset mining by which a predetermined class of categories is used to dynamically build personas. In particular, rather than using frequent itemset mining to fully discover the possible characteristics of a persona, specified characteristics such as user gender, age and location are combined with, e.g., image tags, to form a more limited set of possible personas.

The curator may detect a "traveler persona" in a user based on a GPS analysis of a person images. Likewise, the curator may detect that another user is a "non-traveler" based on ground truth GPS information that indicates that the user does not venture far from home on a daily or weekly basis. The user's non-traveler status may be confirmed, if the user takes sufficient pictures to ascertain by GPS analysis his or her non-traveler behavior. Based on these groupings, a traveler persona may be defined to represent an individual who ventures more than a few hundred miles from home for days on end and takes a number of pictures over a predetermined time period beyond a settable threshold. Analyzing GPS patterns for travel frequency, trip distance, destinations, and photographic activities may be used (a) to enhance the user's profile, (b) assign an appropriate persona to a user, and (c) modify or create new personas. The suggested products may include personalized travel mugs or backpacks, personalized luggage, bragging products like personalized postcards from locations the person has traveled to (e.g., Italy, Paris, Grand Canyon). By analyzing GPS locations and comparing them to a known set of vacation locations, certain cities, theme parks, typical vacation spots, the curator may ascertain a persona type. The curator may mine the GPS data and suggest locations that the user has not yet visited and suggest places to go, to take pictures and to make products.

The set of defined personas may be linear or hierarchical. For example, the system may have a persona corresponding to "sports moms", where that persona may have been manually or dynamically discovered. The class of sports moms may be further specified into for example, "T-ball moms," and "soccer moms." If the system is then presented with images of children engaged in another new activity, such as gymnastics, where gymnastics is ontologically recognized to be a type of sport, then the system may automatically associate general characteristics of "sports moms" to the newly discovered class of "gymnastics mom". This method allows attributes to be associated with a persona even with limited samples. As additional data is obtained, the system may refine a persona definition. In some embodiments, selected characteristics of a generalized persona may be overridden to define a specialized persona. Information may flow up or down a hierarchy. For example, a system may initially have defined personas for "T-ball moms" and "soccer moms." Out of these personas, the system may form a generalized persona "sports mom", which can then form the basis for a newly discovered specialization "gymnastics mom."

In addition, the curator is sensitive enough to specific cultural or ethnic preferences and biases to avoid including an individual in a persona category that would inconvenience or displease the user. The persona may evolve over time, based on additional purchases made by the user or other subsequent data. Persona may be further personalized based on the user's behavior, to capitalize on trends and even fads (e.g., selfies and planking). A persona change or personalization may be triggered, for example, by recent content showing specific behavior by the user (e.g., planking). Over time, persona assignments may be evaluated for persona effectiveness (e.g., correlating user profile and metadata analysis with media asset sharing and sales). The effectiveness of the curator's persona may also be evaluated (e.g., proactive, subtle, or conversational approaches correlated with content and profile).

Tags derived from characteristics of a group of users' media collections can be used for generating a persona for the group. Under this approach, a persona profile can include the distribution of certain tags associated with the users' media collections. For example, a group of young mothers may have a tag profile {baby, child, girl, boy, play, joy, indoors, family, portrait, cute, smile, fun} derived from their image collections and associated with their persona profiles. Likewise, a persona profile for a group of cycling enthusiasts can have the tag profile {bike, trail, outdoors, morning, exercise, road, people, action, leisure}. The tags in the profile may also have a score based on the importance of the tag in the profile. For example, the tag 'indoors' in the tag profile may have a low score because it is not necessary for images to be indoors for that persona profile; whereas the tag 'family' may have a high score in this group.

Appropriate demographic categories to characterize a persona profile may include: age, gender, occupation (e.g., "homemaker," "part-time worker," "hourly worker," "skilled worker", "trade artisan," "professional" or "executive"), income level (e.g., salaried or household income levels), location (e.g., "urban," "suburban," "rural" or a ZIP code), education level (e.g., "High School," "Technical School," "Some College," "4-Year Degree," "Master's Degree," "Professional Degree," or "PhD or other doctorates."), and relationship status (e.g., "married," "single," "divorced," or "alternative").

The curator may, in addition to an initial interview, occasionally further interview a user to refine a user profile, assign an up-to-date persona to the user, or to dynamically modify the persona to reflect a change in the user's attitudes or in response to newly identified opportunities.

In one embodiment, the tags derived from users' collections of media assets may be used for persona profile generation. A persona profile may be viewed as a distribution of tags associated with the persona. For example, a group of young mothers may have a tag profile {baby, child, girl, boy, play, joy, indoors, family, portrait, cute, smile, fun} derived from their image collections and associated with the persona profile. A persona profile for a group of cycling enthusiasts may have the tag profile {bike, trail, outdoors, morning, exercise, road, people, action, leisure}. Tags may be assigned a score in the context of the tag profile based on the perceived importance of the tag in the persona profile. For example, the tag 'indoors' may be assigned a low score in the cyclists' persona profile because "indoors" may play little part for images for that persona profile. Conversely, tags in the associated tag profile are assigned high scores. In some instances, certain tags may be negatively associated with a particular persona; i.e., the presence of such a tag is a negative predictor for the persona.

Persona profiles can be generated using a frequent itemset-mining approach, described below, on a very large set of users to gather tags that commonly occur together. A group of frequent itemsets that are significantly different from each other can be chosen as a set of persona profile to describe the users. A user may be assigned to one or more personas based on matching the tags of the user's collections of media assets with the tag profile of each persona. A weight may be assigned to the user for membership in each assigned persona, so as to indicate the degree to which the tag profile matches.

Another technique for developing personas is progressive profiling which uses multiple choice questions, forms, and directed questioning to users to collect customer insights and opinions, which accumulate and become more detailed over time. These interviews obtain information directly from the customers and prospects. Regional sales teams that engage with customers and retailers can also be interviewed for observations and insights about the customers they serve and their preferences. In practice, the curator can carry out progressive profiling using text or audio interactive interviews.

According to one embodiment of the present invention, the accumulated buying, viewing, social network interactions, listening history, tags and demographics of users are stored using any suitable transactional database format, such as that described in the book "Data Mining Concepts and Techniques," by Han et al., published by Morgan Kaufmann Publishers, Boston, pp. 14-15, 2006. Under this approach, a "transaction" with a unique transaction identifier ("UserID") is assigned to each user. Each transaction is of the form of a tuple consisting of a UserID and a set of quantized descriptors (i.e., (UserID, Descriptor1, Descriptor2, ..., DescriptorN)), where the number of quantized descriptors may be different for each user. Some examples of quantized descriptors may be "mom", "28-32 yrs", "Medium Income", "Teacher", "Honda CRV", or "Environmentally Conscious". The quantized descriptors for each transaction represent a set of "items" which, including any of its subsets, are collectively referred to as an "itemset".

A frequent pattern-mining step is carried out from time to time to identify recurring patterns that are present in the transactional database. The frequent pattern-mining step identifies frequent itemsets. The frequent itemsets are co-occurring descriptor groups that occur in at least a pre-defined fraction of the users. The frequent pattern-mining step may use any suitable method known in the art to identify the frequent itemsets.

In one embodiment, the frequent itemsets are determined using the following method, which uses $\Gamma$ to denote the set of all possible symbolic descriptors in the transactional database, $F \subseteq \Gamma$ to denote an "itemset," and transaction $\tau_i$ denotes a transaction having a variable-length itemset associated with the $i^{th}$ user in the transactional database. Then $\tau = <\tau_1, \ldots, \tau_i, \ldots, \tau_n>$ denotes the transactional database, with each transaction including an itemset corresponding to the corresponding user.

Therefore, for any itemset, F:

$$\text{cover}(F) = \{\tau \in \tau | F \subseteq \tau\} \quad (1)$$

That is, cover(F) denotes the set of transactions $\tau$ in the transactional database $\tau$ containing the itemset F, and therefore are to be counted in the frequency of F. Let support(F) denote the size of cover(F) (i.e., the number of transactions in cover(F)):

$$\text{support}(F) = |\text{cover}(F)| \quad (2)$$

where |A| denotes the number of elements in the set A.

Frequent itemsets $\Phi$ denotes the set of itemsets having support(F) at least "minsup" (which is a predetermined minimum size):

$$\Phi = \{F | \text{support}(F) \geq \text{minsup}\} \quad (3)$$

In one implementation, "minsup" is a value in the interval [0,1], representing a fraction of the total number of transactions in the transactional database. For example, in one implementation, if a "persona" category must have at least 2% of all users, "minsup" may be set to 0.02.

Using the above method, the following persona was obtained in one implementation:

"Betty"—new mom, 28-32, medium income, teacher, Honda CRV, environmentally conscious "Belinda"—new grandmother, 55-60, fixed income, retired, Ford Focus, family matriarch "Bob"—$2^{nd}$ marriage, 35-38, medium income, retail manager, Jeep Cherokee, sports fan Veronica—"Creative Crafter"

Judy—"Power Mom" 32-42, 3 Children (grammar school)

Bill—"Hipster"

Tom—"Action & Adventure"

Sally—"Proud Grandma"

Jeanne—"The Collector"

Cindy—"Family Organizer"

Dan—"The Hobbyist" 50-56, 3 children, 5 grandchildren,

An algorithm for frequent itemset pattern-mining in a transactional database may be, for example, the Eclat algorithm disclosed in the article "Efficient Implementations of Apriori and Eclat" by Borgelt, in the *Proc. of IEEE ICDM Workshop on Frequent Itemset Mining Implementations,* 2003.

Furthermore, usage statistics from a large body of users may be obtained by performing frequent itemset pattern-mining within each specific product (e.g., "Mother's Day card with flowers theme", "Photobook with Disney World travel theme", or "5-image collage with family fun theme"). The itemset pattern-mining may lead to identification of characteristics groups that relate to that specific product. The product could then be recommended to other users with similar characteristics.

Personas are a particularly useful tool for creating customized media products or photographic products for the users because they allow a company:

(a) to understand the appropriate/intended emotional response for large demographic populations;

(b) to build products to satisfy the large demographic populations;

(c) to target-market only those customers most likely to purchase, and to avoid making offers that may alienate potential customers;

(d) to identify important or special content to trigger a spontaneous selling opportunity;
(e) to tailor the product offering to the intended customer; and
(f) to be able to predict sales to the large demographic populations rather than individuals for efficient production, predictable sales, and inventory control.

Generally, customized media products may be physical or virtual. The required resources for virtual products, including computational and network capacities and bandwidth, are generally predicted and additional resources can be incrementally deployed. Such additional resources may be provisioned from third party vendors during times of peak demand.

There are at least two classes of physical customized media products: (a) generic products that can be customized for individual customers and (b) event-specific products that are designed to be customizable or can be included with customized products. A certain level of inventory is required to meet demand. Examples of inventory for generic products include rolls and sheets of paper for creating photobooks, posters, or calendars, printing ribbons, inks, toner, pre-scored greeting cards, blank mugs, t-shirts, apparel items, décor items, mouse pads, album covers, and the like. Generic products can also be customized and produced by third party vendors who are provided with appropriate content and specifications.

While the inventory for creating generic products may not expire, event-specific products are specific to a time period or event, so that the inventory required may diminish in value or render valueless after the specific time period or after occurrence of the specific event. For event-specific products, an accurate estimate of the demand is important to plan the required inventory level. Excess inventory would need to be disposed of, unless the event is recurring. For recurring events, the inventory can be stored until the next occurrence of the event, thereby incurring additional cost and may even incur losses.

Some examples of specific-event products are: a World Cup soccer-themed mug or soccer ball on which a user can insert personal pictures, a Valentine's Day-themed heart-shaped card with pocket to insert candy, a photo t-shirt with a political slogan for supporting a candidate for office, a photobook with motifs celebrating the $100^{th}$ anniversary of a theme park, photo frames with NASCAR drivers and cars, etc. In each of these cases, there is either a specific date or time period after which the inventory has little value. Alternatively, as with the Valentine's Day-themed heart-shaped card, the inventory would have to be stored for a year until the next Valentine's Day.

In addition to generic and event-specific products that require customization, "companion" products can be inventoried for accompanying the main media product in a gift bundle. For example, a generic mug customized by an image of the recipient's new grandson may be accompanied by a choice of an assortment of teas, coffees, or hot chocolates. The concept of the value in inventory can be generalized to the period of time between event recurrences. Single-event items, such as an item specific to New Year's Eve 2017, have little value after that event. Holidays and seasonal items have value annually, but incur inventory and storage costs. A calendar service that offers just-in-time generated calendar pages may be seen as having a monthly period of use. Other generic items are effectively continuously valuable.

When including a customizable product in the product offerings, a set of user personas may be associated with the product to indicate who the target customers are. A probability score may be computed to indicate the likelihood that a customer associated with the user persona may buy the product. The probability can be computed based on, for example, the customer's disposable income, a level of interest in the event the product is associated with, the number of the customer's social network contacts who are also interested in the event (thus, who are potential recipients of a gift of the product), the customer's buying history, and the customer's demographic profile. Based on this probability, an estimate of the quantity of products can then be generated based on the number of customers who are associated with the persona and the average probability of purchase. A small buffer can then be added to ensure there is sufficient inventory for the product.

For events that are recurring (e.g., Valentine's Day and Christmas), previous years' sales data may be used to calculate a required inventory. Using the historical data as baseline, adjustments to the required inventory can be computed based on changes in the populations of customers associated with different personas.

For virtual products (e.g. slideshows, video summaries and highlights, and mini-movies), the television may be a better display medium than the displays on mobile devices. Even for physical products (e.g., photobooks, calendars and collages), a preview on a large screen provides a better viewing experience by allowing the user to select the physical products from their virtual renditions. In addition, the mobile phone is a utilitarian device that many users associate with tasks and work, while the television is a device that the users associate with their leisure hours, when they can be entertained by their images and can engage with the curator. The curator of the present invention may be part of a system that includes a streaming channel (e.g., the "Kodak Moments" channel) that is accessible using streaming devices (e.g., Roku, blu-ray players, Apple TV, and Google Chromecast). When a user accesses the channel, the user is presented choices of recommended products that the curator creates for the user. The user may select the products to view. Previously presented products that have not been deleted by the user remain on the channel for re-viewing.

The curator takes into consideration the required resources (e.g., computational and network capacities and bandwidth) when recommending a virtual product. When a user is reaching a resource constraint, e.g., the user has only a low bandwidth connection, the curator does not suggest at that time products that will require a significant amount of such resources to fulfill or preview. Instead, the curator waits to suggest such products until the user has greater access to resources (e.g., a WiFi network connection), or their resource allocation is improved.

Content evaluation may also be performed for a specific purpose; in one implementation, content evaluation is performed for automatic "virtual product creation" relevant to a particular occasion or "trigger event." A trigger event may be an upcoming planned or spontaneous, generic or personal event to be recognized, celebrated, shared, or memorialized. Typically event triggers are specific dates or timeframes identified from network-connected users' calendars, social network accounts, posts, comments, and the likes, and may include birthdays, anniversaries, graduations, new jobs, new homes, births, deaths, weddings, national holidays, cultural holidays, and ethnic holidays, special regional events (festivals, art shows or fairs) or seasonal events (e.g., wine tours, vacations or races). For example, the curator may notice that several pictures were taken in quick succession of the user in camp clothing, outdoors on the shore of Keuka Lake, holding a very large fish. This event triggers an opportunity for the curator to express, for example, "Wow, that's quite a catch! Would you like it posted on your Facebook Timeline? A framed picture would look great . . . "

The curator can also initiate questions during picture taking sessions, such as "What is that red object that you just took several pictures of?" The user may choose to ignore the question or to respond. The curator may then convert a verbal response to an image tag (e.g., "It's an antique fire hydrant."). The curator would consult its library of terms for "antique fire hydrant."

Event triggers can be adapted to accommodate different regional, cultural traditions, customs, demographics, ethnicities, and other practices. Some techniques for content evaluation based on event triggers may be found, for example, in U.S. Pat. No. 9,037,569, entitled "IDENTIFYING PARTICULAR IMAGES FROM A COLLECTION," to Wood et al., which discloses indexing individual images based upon their capture date and time, and mapping the date and time to concepts such as seasons of the year or other temporal periods. In addition, the '569 patent teaches associating information in personal calendars to the media assets based on civil and religious holidays, birthdays, anniversaries, or specific personal events (e.g., "Florida vacation"). As another example, U.S. Pat. No. 8,634,662, entitled "DETECTING RECURRING EVENTS IN CONSUMER IMAGE COLLECTIONS" to Das et al. discloses other applicable techniques. Similarly, music tracks may be collected automatically according to themes or keywords using techniques that are found, for example, U.S. Pat. No. 9,098,579, entitled "AUTOMATICALLY SELECTING THEMATICALLY REPRESENTATIVE MUSIC" to Luo et al.

Content evaluations can also be triggered by "content triggers." A content trigger may be a special occurrence recorded and identified in the content or metadata, which may be related to a time or date, a location, an event, or an activity. Content triggers can be adapted to accommodate different regional, cultural traditions, gestures, customs, demographics, ethnic, and other practices. The curator may take advantage of content or event triggers to offer or promote a product or service. In addition, the curator may engage the user to acquire additional information about the image content and context examined, so as to better understand the importance and relevance of the image, objects, and individuals analyzed.

The following content triggers may be identified in the media assets to be examined:

| Content Trigger Type | Triggers | Relevance |
|---|---|---|
| Interesting location or seasons | Locations: theme parks, sports stadiums, recreational venues, trails, beaches, ocean, lakes, waterfronts, mountains, restaurants, museums, coffee shops. Seasonal activities: Spring or summer: water sports, boating, sailing, skiing, hiking, mountain biking, hiking, climbing. Fall or winter: hiking, skiing, snow-shoeing, sledding. | May be hierarchically adapted, relevant to persona designation |
| Presenting | presenting an object or objects: a fish, deer or other games, a ribbon, a medal, a trophy, an award, artwork, a craft, a pet, flowers, an animal, a birthday cake, a gift or present, formal attire. Posing in front of natural and artificial, scenic landscapes, landmarks, objects or structures. | Special event ("I'm Special"): the objects being present provides context and significance (e.g., birthday, cultural event, academic or sport achievements) Special Events ("I'm Here"): travel, vacation, field trips |
| Posing | | |
| Groups | Individual or group; object in foreground or background. | Work or social events, objects present may provide context of event |
| Gestures | General expressiveness: holding, pointing, palms up, palms down, opened fist, closed fist, hands folded, thumbs up, thumbs down. Unusual expressiveness: eye gaze or rolling, "duck face", winking, making faces, sticking a tongue out, diving, jumping, planking (a cultic, lying-down game), posing in Hadoukening or Makankosappo stances, batmanning, etc. | Emotion or mood, may have specific or different meanings, positive or negative, in different cultures. For example, in western cultures, nodding downward acknowledges an unfamiliar individual, while nodding upward nod acknowledges a familiar individual. Gestures indicate that the subject or subjects in the image performed something special or otherwise made the image noteworthy. |
| Dynamic gestures, poses, and actions. | video sequences with time or location references. | Same as in still images, only richer content. |
| Proxemics (i.e., the study of the nature, degree, and effect of the spatial separation individuals naturally maintain) | Proximity among individuals appearing in an image | Significance depends on social and interpersonal situations, and environmental and cultural factors. Individual proximity in photos may indicate importance. |

According to one embodiment of the present invention, a photograph that has been analyzed includes the following metadata:

Objects Identified: "fishing pole", "mountain", "shoreline", "lake", "fish", "female child", "Betty Johnson", "boat", "left hand—presenting", "expression—smile", etc. . . . . . .
    time: 11:32 EST
    date: 25 Jul. 2015 SAT
    location: LAT: 42.585876 LONG: −77.082526
    location identity: address: 555 Eastlake Rd. Penn Yan, N.Y. 14527
    details: "Johnson Family Cottage"
    environment: seasonal, recreational, waterfront, beach, cottage, boating, fishing
    trigger condition: 1
    trigger type: fishing, catching fish, presenting fish
    number of individuals: 1
    identity: Betty Johnson
    relationship: daughter
    birthday: 2 Jun. 2004
    wedding date: 0
    children: 0
    detected language: American English
    confidence: true (value: 1)
    pose: roll (−0.33), yaw (1.25), pitch (−2.31)
    race:
    Caucasian (0.92)

face brightness: 0.62
face sharpness: 1.4
emotion: calm: 73%, happy: 45%
age: 11.3 (value: 11.3)
smile: true (value: 0.92)
glasses: no glass (value: 0)
sunglasses: false (value: 0)
hat: false (value: 0)
beard: false (value: 0)
mustache: false (value: 0)
eye_closed: open value: 0)
mouth_open_wide: 0% (value: 0)
beauty: 96.22 (value: 0.9622)
gender: female (value: 0)
zoom ratio: (eye separation distance/frame size)
share to Twitter: false (value: 0)
share to Instagram: true (value: 1)
share to Facebook: true (value: 1)
likes: 27
shares: 11
comments: 3
    "What a catch!"
    "Fish fry tonight Betty."
    "Your Grand Dad Jake would be so proud of you Betty."

After indexing the media assets or, if the media assets have already been indexed (e.g., metadata available from a $3^{rd}$ party service), the curator organizes the indexed metadata relative to the user's profile information. Some images may be identified as "special images", which may be set aside as potential assets for an image product or gift, as a means to associate the appropriate persona with the user, to discover new imaging fads, trends, and behaviors, and to understand the user's image taking or usage priorities (e.g., documenting, celebrating, sharing, bragging, gifting, or memorializing).

Based on the results of analysis, the curator may recommend products to the user. Techniques for image product recommendation are disclosed, for example, in U.S. patent application, Ser. No. 62/273,641, entitled "METHOD FOR IMAGE PRODUCT RECOMMENDATION". The curator may identify "important images", based on esthetic rules, image usage and capture patterns, social interests, and relationships with other individuals depicted in the images or associated with them, for potential use in image products. For example, the analysis may infer "sentimentality" in a user who has recorded numerous images of cats in a home location indication. It may further infer that the user is likely to enjoy cat-related graphics on customized media products. The curator may make suggestions and recommendations that are intended to educate the user about the possible sharing, creative, and gifting opportunities presented by the user's photographic and video collections.

Figures 9A, 9B:
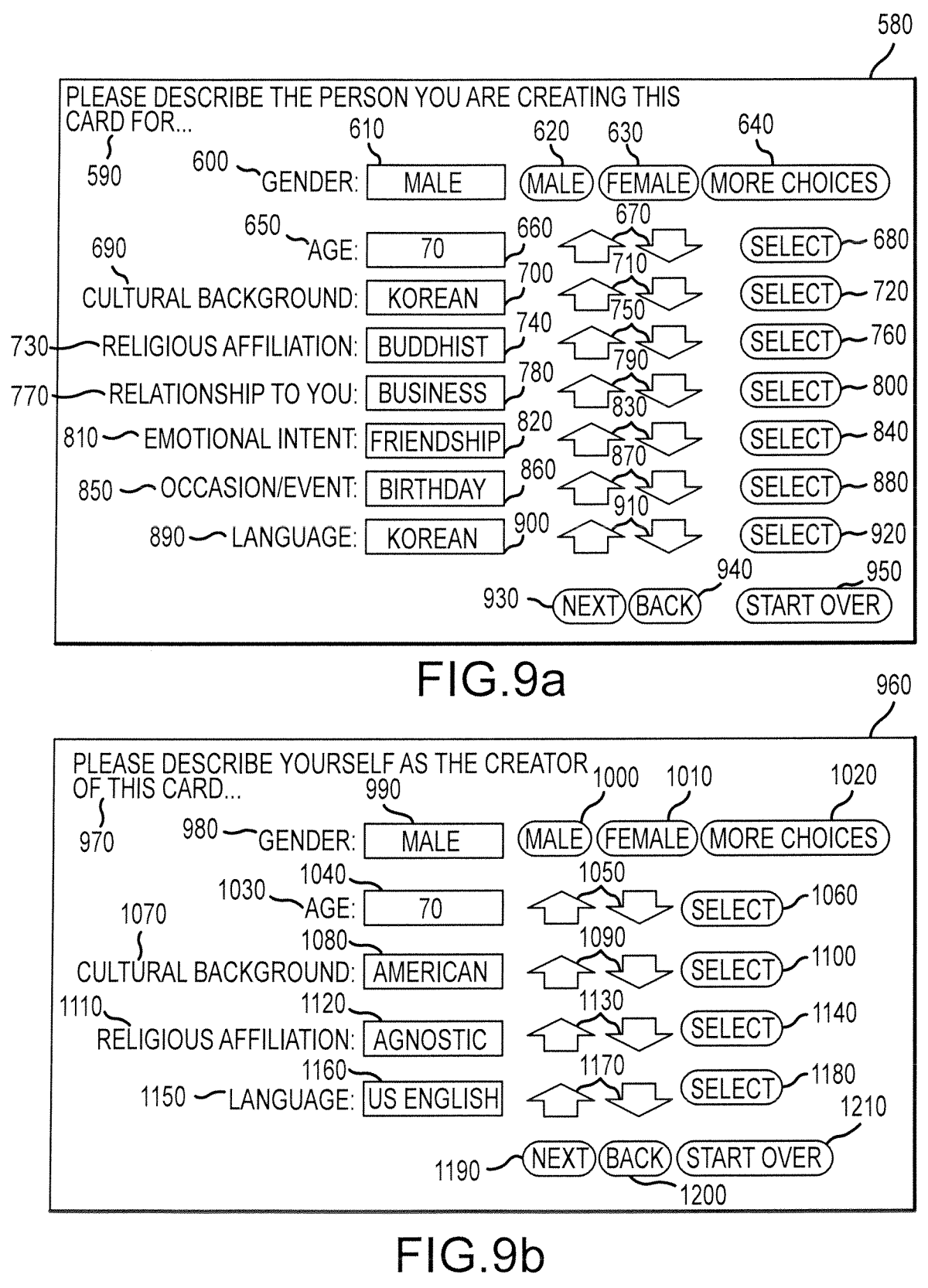

The recommended products may include, for example, crowd-sourced creation of virtual products and promotional virtual versions of potential hard copy products. The operators may be paid employees of the curator's creator or private contractors in a competitive environment (e.g., the artists of the "ETSY" market). Some services, such as the "Easy as Amazon" service allows creation of customized photographic products and photographic product types that includes the user's or others' images to be created and offered to the user. The curator may also receive input information to further customize a product for specific individual or occasion. FIGS. 9a and 9b show two forms that the curator may present to a user to customize a greeting card to be created, in accordance with one embodiment of the present invention. As shown in FIG. 9a, the curator receives a profile regarding the recipient of the greeting card. Similarly, in FIG. 9b, the curator receives a profile of the sender. Note that, in this instance, the curator is made aware of cultural and ethnic sensitivity in creating the image products it recommends. For example, FIGS. 9a and 9b show that the recipient is a male Korean Buddhist whose primary language is Korean, while the sender is an American female who religiously agnostic and speaks American English. Techniques for such products that can be used may be found, for example, U.S. patent application, Ser. No. 62/255,239 entitled "CROSS CULTURAL GREETING SYSTEM,". Other image product creation techniques may be found, for example, in U.S. patent application, Ser. No. 14/629,075, entitled "A METHOD FOR OUTPUT CREATION BASED ON VIDEO CONTENT CHARACTERISTICS," filed Feb. 23, 2015.

In some embodiments, the curator extends beyond serving the initial user to the recipient or recipients. For example, the curator may suggest that the user create a framed photograph gift product for a recipient (e.g., the user creating a framed picture of her daughter as a gift to the user's own mother). In this instance, the curator also recommends that the user invites the grandmother to participate in completing the final details of the gift. Such final details may include, for example, picking the frame color and style from a collection of different color and different style frames. The curator may engage the recipient (i.e., the grandmother) to present her possible product previews and the allowable customizable options within a range of costs and options the user has authorized. (The curator may offer the recipient further customization to the product at the recipient's own expense.) The curator may also have gathered enough information about the recipient to have associated the recipient with a persona. In that case, based on the grandmother's persona, the curator recommends to the grandmother a particular frame style (e.g., Victorian), or a particular frame color. The curator may exploit knowledge about the grandmother (e.g., the grandmother's house décor) to suggest that a particular frame color would accent the colors of her living room. The final product variation as decided by the recipient would be delivered to the recipient, with an optional notification sent to the user of the final choice.

When evaluating an event trigger or recommending a product, the curator takes into consideration the motivations and obstacles to decision-making by the user. Some typical motivation categories that can be incorporated into the assigned persona are: (a) celebrate or recognize important life events, (b) connect or share with friends and family, (c) sharing creativity, (d) recording and sharing hobbies, crafts, collections, or (e) sharing the excitement or bragging rights. Obstacles to decision-making may include: (a) "I'm too Busy", (b) "I'm not Creative", (c) "It's too Hard", (d) "It's too Expensive", and (e) "I'm concerned about Security or Privacy." Based on the motivations and obstacles assigned to the persona, the curator may suitably intervene, for example, by alerting the user prior to an upcoming event, taking into account (a) the time required to produce and deliver customized product, and (b) the time window for user requires for his or her decision. Based on these factors, the curator may present the virtual product on a preferred day and time appropriate to the persona. A successful intervention (i.e., one that results in a purchase decision by the user) requires the curator to intervene with a timely presentation, or perhaps also offering an incentive (e.g., free shipping if the user orders within a specific future time window).

In some embodiments, when evaluating an event trigger or recommending a product, the curator further considers the current environmental characteristics of the user. Environmental characteristics may include the ability of the system to generate and deliver either a product preview or the actual product to the user. For example, if the user is currently connected to the Internet via a low bandwidth data connection (e.g., a 3G cellular network), or the user is close to approaching a data cap on their cellular plan, then the curator will not recommend any product that requires a large amount of data be transferred between the user's device and the system to display. When the user's environment changes, for example, after the user connects to a Wi-Fi network, such omitted products may then be presented. Similarly, if the user has both a smartphone with a small display and a tablet device, the curator will not recommend a product that requires a larger display to be adequately previewed when the user is using the smartphone. The curator may wait until the user is interacting with a more appropriate device. In some embodiments, the system may also consider the user's current activity on a device. A complex product such as a photobook would not be shown when the user is expected to be only briefly interacting with the device. Instead, such a product would be displayed at a time when the system predicts the user to have a greater degree of leisure or freedom to for the product preview.

In one embodiment, a tool for creation of a media-centric product includes look-up tables. FIG. 10a shows a look-up table that can be used by the curator to a profile of the desired product, according to one embodiment of the present invention. As shown in FIG. 10a, the curator selects a product based on five profile categories: relationship (1230), emotional intent (1240), occasion (1250), cultural profile (1260) and religious affiliation (1270). Each entry under a profile category may be associated with a characteristic of the media-centric product to be created. FIG. 10b shows components of a greeting card that can be selected based on the values assigned to one or more of the profile categories. For example, if "romantic relationship" is selected under relationship 1230, "romance" is selected under emotional intent 1240, and "Anniversary" is selected under occasion 1250, the curator will be directed by the look-up table 1280 (FIG. 10b) to card components "red-roses" under "flowers" component 1310, and "respectful" under graphics 1300.

In presenting the virtual product, the curator may use marketing techniques, such as:
(a) content, relationship, or event-related pitches;
(b) randomly selected products, but logged to prevent repetition in future pitches; and
(c) personalizing the approach with the inclusion of specific names, relationships, and events; for example:
"Share your Creativity with _____,"
"Recognize the Accomplishment of friends and family."
"Celebrate with the ones you love."
"Make _____ feel special."
"Treat yourself."
"Reconnect with family and friends."
"Let them know you care."
"Make _____'s day."
"Share the good times."
"Cherished Memories."
"Celebrate _____'s new job."

The following are two examples that illustrate the operation of the curator:

Example 1

Early in December, a user posts on her Facebook account a series of photos her new baby, Audrey. Her Netflix account indicates that she has streamed the title "Yule Log Fireplace" and several holiday-themed and romantic comedy movies. Her Amazon account indicates also that she has recently purchased Christmas decorations. Based on these user behaviors, media selections, the purchase dollar amount and frequency, the curator presents several virtual customized photographic products for the user's purchase that features Audrey's image. The specific products are selected based on the Amazon purchase history. For example, if the user's purchase on Amazon exceeds a predetermined threshold dollar amount, the user will be first offered a three-piece ornament set each inset with a different picture of Audrey. However, if the user purchase was less than the threshold amount, the user will be offered a single ornament with Audrey's picture. Based on the style extracted from her Netflix purchases, the ornaments offered to the user will be in the "Cute or Fun" or "Traditional" categories. If the offer is successful (i.e., the user purchase the offered ornament or ornaments), the sale is noted and will be taken into account in a future update, according to behavior-based product selection algorithm implemented in the curator.

Example 2

Early in December, an individual identified as the user's mother ("Grandma") commented on a series of photographs of her grand-daughter, Audrey, posted by the user on her Facebook account. Grandma shares Audrey's pictures with her friends and family, tagging the pictures with the comments "my beautiful granddaughter Audrey!" or "my first grandchild!" The user subsequently "liked" Grandma's sharings. The curator, which monitors the user's Facebook account, upon noting these activities, suggests that the user send a "Baby Brag Book"—a virtual picture product featuring Audrey's pictures—to Grandma for Christmas. This is accomplished by the curator presenting the virtual picture product for the user to accept, reject, edit, or to ask for similar products.

The following are some examples of proactively engaged interactions by the curator with the user:

Example 1

"I've taken the liberty of creating a photo album of your recent Cruise to Alaska. You took some spectacular photos of whales and glaciers. Your Sister Betty likes Alaska and whales too, should I share the album?" . . . .

Example 2

"I've noticed that you took a picture of your lunch yesterday when you were at, "Tokyo Sushi Bar" with your friend Jenny today. You also took a nice photo of Jenny smiling. Should I send those photos to Jenny or post them to Facebook? I can also include a comment if you would like. Just tell me what you would like it to read, I'm listening . . . .

Example 3

"I see you are scheduled to have lunch with your friend Jenny again next week and I noticed that Jenny has a birthday next week. Would you like me to make a birthday card for Jenny? I can use one of the many photos of Jenny and you together. Here are the best photos of Jenny and you together, which one do you like? Jenny, often posts photos and articles about "cats", I can make a "Cat themed" birthday card for her if you would like.

Example 4

"I see that you have a great portrait of your daughter Brenda, but the photo has a problem with "red eye". I can correct it if you wish. Should I correct it?

Example 5

"I have collected all of best shots of you and your sisters and made a collage. Mother's Day is in a week, would you like me to use this collage to make and send a Mother's Day card for you Mom?

Example 6

"Nice fireworks, Happy July 4th! What other holidays do you enjoy celebrating?"

Example 7

"Another great soccer game photo! Do you know anyone on the team"?

Example 8

"I see you travelled to India. Do you have friends or relatives there?"

Some examples of products that can be offered to the user out of his or her media assets:

Example 1

"A Year of Selfies"—When the number of "selfies" found among a user's media assets exceeds a predetermined threshold, a virtual picture album or slide show may be created. For example, to provide better scene-to-scene transitions in a slide show of selfies, the curator may (i) order the selfies chronologically, (ii) align the eyes or faces from picture to picture, (iii) process the pictures using selective zooming, crop, rotating or other image editing techniques to establish matching ocular separations or face orientations for the selfie images, and (iv) sequence the images to make a user-controlled variable speed for the digital slide show. Examples of such techniques may be found, for example, in U.S. Pat. No. 8,692,940, entitled "METHOD FOR PRODUCING A BLENDED VIDEO SEQUENCE" assigned to Kodak Alaris.

Example 2

"Selfie Flip Book or Album", "Selfie Poster" (e.g., an arrangement of 5"×4" and 4"×4" selfies on a 24"×36" poster, showing a range of user-selected expressions), a set of "Selfie Drink Coasters", and"Selfie Stickers"

Example 3

Selfie or Portrait Auto Tool—A tool that includes utilities for (i) aligning, zooming, panning, or rotating images anchored at certain face feature points (e.g., eyes, ocular separation, mouth, or nose) that can be applied post-capture or as capture upon a trigger, and (ii) arranging images chronologically or through a set of recognized "range of expressions", "gaze directions", incremental head positions. These features allow creation of image collections that have seamless transition from frame-to-frame (gif, movie, VR model). Such a product is useful, for example, for photographing small children and infants, or as a creative or automatic image creation tool.

To offer media-centric products to a user, curator may also take advantage of the user's activities and situations in real-time. Internet-of-things (IoT) devices—which include a large number of networked sensors (e.g., thermostats, appliances, home automation systems, and automotive devices)—are expected to reach 26-30 billion by 2020. The curator can take advantage of such sensors. For example, a home equipped with an IoT security system may keep track of the identities of the persons in the house at all time, as the system identifies each person and assigns a unique security code when the person enters the monitored perimeter. (A person's presence may be detected from registration signals from his or her smartphones). Alternatively, at any given time, the heating or cooling system or the lighting may operate according to the preferences of particular people currently in the house. The curator may use such information to interact with the people in the house (e.g. the curator can provide the curated product to a specific person after the person arrived at his or her home and has relaxed for a while). The virtual curator may also change its persona based on the persons detected to be at home.

The sensor output signals of IoT-enabled appliances can indicate the type of activities occurring in the house. For example, the time of switching on the television set or turning to a specific channel on a television set, when correlated with a program schedule, may indicate a specific television program being watched. Similarly, frequent accesses to a refrigerator may indicate cooking. The operations of the coffee machine, a washer and a dish washer may indicate coffee being brewed, laundry and dishes being cleaned, respectively. Using such data, the curator can select a favorable time to interact with a given user. For example, the curator should refrain from interacting with a user watching sports program on the television, or performing certain domestic chores. Conversely, the curator should interact with a user during an advertisement break, or between television programs. A pattern of user behavior may be learned over time. The curator may maintain a history of its interaction with a user, to allow the curator to analyze when the user responded favorably, by viewing or buying the curated product or engaging with the curator, or when the user did not respond favorably. Based on the maintained interaction history and the detected activities in real time, the curator may learn rules to determine the ideal conditions to engage the user.

Smart television sets and mobile devices are equipped with microphones, computational processors, and algorithms that may be used to monitor activities in the environment. Such activities may include a person in the room watching television or the person using voice commands, such as "mute", "change channel", "call Mom" and the like. The music that is being played in the room may suggest a user's mood. If a person is detected to have just been involved in an argument with his or her spouse, based on the detected loudness and tone of their interaction and certain keywords being recognized to have been spoken, the curator should not try to recommend purchase of pictures, at least not purchasing pictures to give to the spouse! If a user is detected to have just cleaned up a dog mess, the curator should not suggest framed pictures of the dog. In contrast, if snowy weather is detected, the curator may suggest pictures of last winter's trip to Florida.

A wearable health or sport device (e.g., a FitBit device) monitors a user's movements and physiological conditions and can be used to predict the user's mood. Monitored and recorded indications of physical exertion, movement, heart rate, and breathing pattern may represent a user's current physical conditions that can be compared to known profiles to estimate or approximate the user's psychological condition or mood.

Thus, using physiological, behavioral, and emotional data actively or passively, whether the data is provided by the user, recorded by personal or environmental sensors, or interpreted from images, video, or audio recordings (e.g., using such algorithms as Eulerian Video Magnification or motion vector determination).

"Virtual reality" (VR) technology is increasingly important in consumer electronics. Viewing photographs in an immersive environment is well-known, such as illustrated by Flickr VR (http://www.flickr.com/vr) and similar applications. With a suitable VR viewer, which can be an integrated specialty device, or a headset frame with lenses to accommodate a large display smart phone, images and videos can be displayed in a VR environment. A user wearing a VR headset may be presented with a VR environment for photograph browsing, for example, in the form of a virtual sphere around the user. The images of a photo collection are projected as inward-facing images lining the surface of the virtual sphere. In that example, the user can navigate the VR environment using a pointing device, gestures recorded from the VR headset, VR gloves or controllers, or gestures recoded by one or more cameras monitoring the user, head movements, facial expressions or voice commands. The user can sort and select images, magnify images, and select presentation formats, such as a conventional sequential presentation typical of a photographic "slide show" or presentation formats more suitable to VR environments, such as spiral or rotational presentation of images within the VR environment. The organized photograph collection can be displayed as static or dynamic visualizations using the metadata and tags associated with individual images and video clips as sort and presentation criteria, such as recognized faces, objects, and scene types, time frames or locations. In addition, an individual image or a set of images can be used to create the navigable environment. Also, original images recorded as stereoscopic images or images that have been converted to stereoscopic images will appear to have depth in a VR environment.

The curator can also serve as an educational resource, e.g., to help a user put together a report on collected images or videos, or assist the user on a project that is based on the collected images and videos. As many users either do not like the sound of their own recorded voices or lack the confidence to narrate even a brief story, the curator can provide audio narration for use with a multimedia storytelling product or feature. Generally, therefore, the curator may serve as a "user interface shell," i.e., an application that coordinates between the user, image organization and manipulation software, and the user's collection of personal content.

The curator may also process the media assets to facilitate sharing the media assets among friends and on social networks. Techniques for such processing may be found, for example, in U.S. Pat. No. 9,185,469, entitled "SUMMARIZING IMAGE COLLECTION USING A SOCIAL NETWORK", to Gallagher et al.

The curator may perform content consumption pattern analysis, which provides analytics data such as page views, time on site, bounce rates, ad clicks, and downloads. Such analytical data provides insight on where the users' primary unmet needs and interests that can be used to develop personas for the users'.

The above detailed description is provided to illustrate the specific embodiments of the present invention and is not intended to be limiting. Numerous modifications and variations within the scope of the present invention are possible. The present invention is set forth in the accompanying claims.

We claim:

1. A computer-implemented method configured to run on a networked computational device comprising a processor, the method comprising:
    obtaining permission from a user to access the user's media assets and the user's social media, wherein the media assets are stored on a storage device on the networked computational device and a networked storage device associated with the user's social media;
    the processor analyzing the user's media assets and social interactions on the user's social media to create cross-referenced metadata associated with the user's media assets;
    generating and displaying to the user, via a display on the networked computational device, a questionnaire to query the user about the user's personal information;
    the processor receiving answers from the user, the answers comprising the user's personal information;
    the processor selecting a curator persona from a set of predetermined curator personas, wherein the selected curator persona compares most closely to the user, based on the cross-referenced metadata and the user's personal information;
    the processor identifying a customized media-centric product, wherein the customized media-centric product incorporates at least one of the user's media assets; and
    using the curator persona to present the customized media-centric product to the user via the display on the networked computational device.

2. The method of claim 1, further comprising the processor identifying suggested recipients for the customized media-centric product based on the cross-referenced metadata associated with the user's media assets.

3. The method of claim 1, wherein the cross-referenced metadata associated with the user's media assets comprises user relationships and life-events identified by analyzing one or more of content, metadata, comments, shares, and tags associated with the user's media assets.

4. The method of claim 1, further comprising the processor identifying important media assets by analyzing one or more of content, metadata, comments, shares, and tags associated with the user's media assets, and using the curator persona to present to the user the important media assets.

5. The method of claim 4, wherein the important media assets comprise the user's media assets that have been shared with or by the user on the user's social media.

6. The method of claim 4, further comprising the curator persona creating and presenting to the user virtual versions of the customized media-centric product incorporating an important media asset.

7. The method of claim 1, further comprising the curator persona providing the user, via the display on the networked computational device, with an option to select, modify, or request alternatives to the customized media-centric product.

8. The method of claim 1, further comprising the curator persona presenting to the user, via the display on the networked computational device, an option to purchase the customized media-centric product.

9. The method of claim 1, wherein the curator persona interacts with the user, via the display on the networked computational device, in order to customize the customized media-centric product for a specific recipient.

10. The method of claim 1, wherein the processor selecting the curator persona is further based on analyzing the user's social media accounts, media-centric product purchase histories, and media-centric product type and format preferences.

11. The method of claim 10, wherein the user's personal information comprises ethnic background of the user.

12. The method of claim 1, wherein the customized media-centric product is selected from the group consisting of: a hardcopy print, a photo album, a photo calendar, a photo greeting card, a poster, a collage, a physical product with a tangible surface incorporating printed versions of the user's media assets, a soft display digital multimedia slide show, a digital movie, and a highlight video.

13. The method of claim 1, wherein the customized media-centric product includes a still image of an extracted person from video recordings of the extracted person.

14. The method of claim 1, wherein the customized media-centric product is customized with assistance from a remote operator, by a crowd sourced operator, by a recipient or by the user.

15. The method of claim 14 wherein, prior to the customized media-centric product being customized with the assistance by a recipient, the user authorizes a range of options that may be presented to the recipient for customization.

16. The method of claim 1, wherein the processor analyzing social interactions on the user's social media comprises monitoring frequencies and durations of one or more activities selected from the group consisting of: recording, viewing, sharing, editing, and rating the user's media assets.

17. The method of claim 1, wherein the customized media-centric product incorporates one or more of: professionally produced graphics, crowd-sourced graphics, clip art, music, audio, narration, text, transitions, special effects, 3-D rendered objects, still images, and videos sequences.

18. The method of claim 1, wherein the customized media-centric product is based on a planned event or a spontaneous event.

19. The method of claim 1, wherein the curator persona interacts with the user via voice and audio interactions.

20. The method of claim 1, wherein the processor identifying a customized media-centric product comprises dynamically adapting the media-centric product based on one or more of: user location, network bandwidth, the networked computational device capabilities, and data plan limitations.

21. The method of claim 1, wherein the processor analyzing the user's social interactions on the user's social media comprises monitoring physiological responses to the user's media assets.

* * * * *